United States Patent
Nanataki et al.

(10) Patent No.: US 7,495,378 B2
(45) Date of Patent: Feb. 24, 2009

(54) DIELECTRIC DEVICE

(75) Inventors: Tsutomu Nanataki, Toyoake (JP);
Hirofumi Yamaguchi, Komaki (JP);
Nobuyuki Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 96 days.

(21) Appl. No.: 11/180,966

(22) Filed: Jul. 13, 2005

(65) Prior Publication Data
US 2006/0250067 A1 Nov. 9, 2006

Related U.S. Application Data

(60) Provisional application No. 60/646,745, filed on Jan. 25, 2005, provisional application No. 60/588,093, filed on Jul. 15, 2004.

(51) Int. Cl.
*H01J 1/02* (2006.01)
(52) U.S. Cl. .................. 313/311; 313/309; 313/310
(58) Field of Classification Search .......... 313/311, 313/309, 325, 310; 315/169.3, 169.1; 362/309–311, 362/325, 310, 495, 336, 346 R, 351
See application file for complete search history.

(56) References Cited

U.S. PATENT DOCUMENTS

| | | | | |
|---|---|---|---|---|
| 2,903,374 A * | 9/1959 | Ramse et al. | ................ | 106/284 |
| 5,616,257 A * | 4/1997 | Harada et al. | ............ | 219/56.21 |
| 5,871,870 A | 2/1999 | Alwan | | |
| 5,900,301 A * | 5/1999 | Brandes et al. | ................ | 428/77 |
| 6,100,628 A | 8/2000 | Coll et al. | | |
| 7,176,609 B2 * | 2/2007 | Takeuchi et al. | ............ | 313/311 |
| 2002/0130604 A1 * | 9/2002 | Xia et al. | .................... | 313/309 |
| 2005/0073234 A1 * | 4/2005 | Takeuchi et al. | ............ | 313/311 |

FOREIGN PATENT DOCUMENTS

| | | |
|---|---|---|
| JP | 44-26125 | 11/1969 |
| JP | 46-20944 | 6/1971 |
| JP | 60245153 A | * 12/1985 |
| JP | 1-311533 | 12/1989 |
| JP | 7-147131 | 6/1995 |
| JP | 2000-285801 | 10/2000 |
| JP | 2004-014365 | * 1/2004 |
| JP | 2004-146365 | 5/2004 |
| JP | 2004-172087 | 6/2004 |
| WO | WO 01/11648 | 2/2001 |
| WO | WO 01/11648 A1 | * 2/2001 |

OTHER PUBLICATIONS

Yasuoka and Ishii "*Pulsed Electron Source using Ferroelectric Cathode*" J. Appl. Phys., vol. 68, No. 5, pp. 546-550, 1999.
V.F. Puchkarev, G. A. Mesyats "*On the mechanism of emission from the ferroelectric ceramic cathode*," J. Appl. Phys., vol. 78, No. 9, Nov. 1, 1995, pp. 5633-5637.
H. Riege "*Electron emission ferroelectrics-a review*," Nucl. Instr. and Mech., A340, pp. 80-89, 1994.

* cited by examiner

*Primary Examiner*—Bao Q Truong
(74) *Attorney, Agent, or Firm*—Burr & Brown

(57) ABSTRACT

A dielectric device of higher performance is provided. An electron emitter to which the dielectric device of the present invention is applied includes an emitter formed by a dielectric, and an upper electrode and a lower electrode to which a drive voltage is applied for the purpose of electron emission. The emitter includes an upper layer formed from plural dielectric particles, and a lower layer formed from plural dielectric particles, below the upper layer. The upper layer and/or lower layer are formed by aerosol deposition.

11 Claims, 18 Drawing Sheets

DIELECTRIC DEVICE

This application claims the benefit of U.S. Provisional Application Ser. No. 60/588,093, filed Jul. 15, 2004, and U.S. Provisional Application Ser. No. 60/646,745, filed Jan. 25, 2005, the entireties of which are incorporated herein by reference.

BACKGROUND OF THE INVENTION

1. Field of the Invention

This invention relates to a dielectric device using dielectric properties and electrical-mechanical conversion properties.

2. Description of the Related Art

In the related art, a type of dielectric device using ferroelectric ceramics is known. The dielectric device using this ferroelectric ceramics can usually be obtained by forming a laminated structure, by patterning an electrode on a ferroelectric ceramic thin plate formed by the screen printing method or the green sheet method, or joining to another metal or a ceramic thin plate.

Here, the screen printing method is a method of obtaining a ceramic thin plate used as the base of a dielectric device by forming a film on a predetermined substrate from a slurry containing a ceramic powder dispersed in an organic binder by screen printing, and sintering this film at a high temperature of 900° C. or higher. The green sheet method is a method of obtaining a ceramic thin plate by forming a thick film of predetermined thickness from the aforesaid slurry, drying to obtain a green sheet, and sintering at a high temperature in the same way as above after hole-punching. In recent years, this kind of dielectric device has been used as an electron emitter, for example in field emission displays (FEDs) or electron beam sources in electron microscopes.

The electron emitter is operated in a predetermined vacuum level, and when a predetermined electric field is applied to the electron emission portions (hereafter, emitters), electrons are emitted from the emitters. When this electron emitter is used in an FED, plural electron emitters are arranged in two dimensions, and plural fluorescent bodies are respectively disposed at a predetermined interval from the electron emitters so as to correspond to the plural electron emitters. By selectively driving one of these plural electron emitters arranged in two dimensions at any desired position, electrons can be emitted from an electron emitter in any desired position, fluorescence can be emitted from a phosphor in any desired position due to collision between the emitted electrons and the phosphor, and a desired display can thus be obtained.

Some early examples of this electron emitter are given for example in the following Patent References 1 to 5. These electron emitters do not use the aforesaid dielectric device, but instead have an emitter which includes minuscule conductive electrodes with sharp tips. When a predetermined drive voltage is applied between a reference electrode opposite to this emitter and the emitter, electrons are emitted from the tips of the emitter. Therefore, to form this minuscule conductive electrode, microfabrication by etching, forming or the like is required. Also, to emit a predetermined electron amount into a predetermined vacuum level from the tips of the aforesaid conductive electrodes, a sufficiently high voltage is required as the drive voltage, and an expensive drive element which can supply a high voltage, such as an IC for driving this electron emitter, is required.

As stated above, the problem of the electron emitter using a conductive electrode as an emitter has been that the production costs of not only the electron emitter itself but also the device to which the electron emitter is applied increase. In recent years, therefore, an electron emitter using the aforesaid dielectric device, i.e., an electron emitter wherein the emitter is comprised of a dielectric, has been designed, as disclosed for example in the following Patent References 6 and 7. General knowledge on the electron emission in the case of using a dielectric as the emitter is disclosed in the following Non-Patent References 1 to 3.

The electron emitter disclosed in Patent References 6 and 7 is configured so as to: cover a part of the upper surface of an emitter including a dielectric with a cathode electrode; and dispose an anode electrode at a position on or below the lower surface of the emitter or a position apart from the cathode electrode at a prescribed interval on or above the upper surface of the emitter. That is, the electron emitter is configured so that the exposed surface portion, where neither a cathode electrode nor an anode electrode is formed, of the emitter exists on the upper surface side of the emitter in the vicinity of the outer edge of the cathode electrode Then as the first step, voltage is applied between the cathode electrode and the anode electrode so that the cathode electrode has a higher potential, and the electric field formed by the applied voltage makes the emitter (the exposed portion in particular) get into a prescribed polarized state. Next as the second step, voltage is applied between the cathode electrode and the anode electrode so that the cathode electrode has a lower potential. At this time, primary electrons are emitted from the outer edge of the cathode electrode, the polarization of the emitter is reversed, the primary electrons collide with the exposed portion of the emitter where the polarization has been reversed, and thereby secondary electrons are emitted from the emitter (the exposed portion in particular). The secondary electrons fly toward a prescribed direction caused by a prescribed electric field applied from outside and thereby electrons are emitted from the electron emitter.

[Patent Reference 1] JP-A No. 311533/1989
[Patent Reference 2] JP-A No. 147131/1995
[Patent Reference 3] JP-A No. 285801/2000
[Patent Reference 4] JP-B No. 20944/1971
[Patent Reference 5] JP-B No. 26125/1969
[Patent Reference 6] JP-A No. 146365/2004
[Patent Reference 7] JP-A No. 172087/2004
[Non-Patent Reference 1] Yasuoka and Ishii "Pulsed Electron Source using Ferroelectric Cathode," *J. Appl. Phys.*, Vol. 68, No. 5, pp. 546-550, 1999
[Non-Patent Reference 2] V. F. Puchkarev, G. A. Mesyats "On the mechanism of emission from the ferroelectric ceramic cathode," *J. Appl. Phys.*, Vol. 78, No. 9, 1 Nov., 1995, pp. 5633-5637
[Non-Patent Reference 3] H. Riege "Electron emission ferroelectrics—a review," *Nucl. Instr. and Mech.*, A340, pp. 80-89, 1994

SUMMARY OF THE INVENTION

In the dielectric device of the related art, as described above, a ceramic thin plate formed by the screen printing method or the green sheet method is used, so the following problems occurred.

First, the ceramic thin plate obtained by the screen printing method or green sheet method is obtained by drying and sintering a slurry in which a ceramic powder is dispersed, so many types of ceramic particles having a broad particle size distribution from fine particles to coarse particles are present in the ceramic thin plate. In a dielectric device (in particular, an electronic device) such as the aforesaid electron emitter or surface acoustic wave (SAW) device wherein the physical properties in the vicinity of the surface of the ceramic thin plate have a large effect on performance, it is difficult to obtain a desired surface state and obtain better characteristics. Hence, in the related art, no consideration is given to the matching of the application of the dielectric device and its required characteristics to a suitable structure of the ceramic thin plate.

In the screen printing method or green sheet method, an organic binder from a slurry film or green sheet is decomposed/vaporized, and ceramic crystals are grown at a high temperature to cause adjacent ceramic particles to fuse together. By this process, the ceramic thin plate which forms the base of these dielectric devices can be obtained, but voids between adjacent ceramic particles cannot be completely eliminated, and it is difficult to obtain a high filling density of the ceramic material in the ceramic thin plate. Specifically, taking the case where there are no voids as the theoretical density, the density achieved is of the order of 70 to 80% of the theoretical density. Therefore, if a dielectric device is used as an electronic device employing dielectric properties such as the aforesaid electron emitter, a high electric field could not be applied.

Since sintering is performed at a high temperature of 900° C. or higher, the ceramic layer is damaged by differences of thermal expansion coefficient with the substrate underneath the ceramic layer, a material with low heat resistance such as glass cannot be used as the substrate, and in particular, it is difficult to increase screen size when applied to an FED.

Further, in the electron emitter disclosed in Patent References 6, 7 using the aforesaid related art dielectric device (hereafter, referred to simply as "related art electron emitter"), when electrons are emitted from a cathode electrode toward an emitter, electrons are emitted at the portion, on the surface of the cathode electrode, where lines of electric force concentrate and electric field intensity increases (here, the fact that lines of electric force concentrate on the surface of an electrode which is a conductor and thereby the electric field intensity at the portion where lines of electric force concentrate increases as stated above is hereunder referred to simply as "electric field concentration" and the portion where the electric field concentration occurs is hereunder referred to simply as "electric field concentrated portion").

Here, an example of a conventional electron emitter is schematically shown in FIG. 21. In a conventional electron emitter 200, an upper electrode 204 is formed on the upper surface of an emitter 202 and a lower electrode 206 on the lower surface thereof. The upper electrode 204 is formed on the emitter 202 in close contact therewith. In this case, the electric field concentrated portion is limited to the outer edge of the upper electrode 204 where the upper electrode 204, the emitter 202 and a vacuum intersect with each other, namely the triple junction. In the case of the conventional electron emitter 200, since the number of the electron emissive sites is limited as stated above, there have been such certain limitations as represented by the fact that drive voltage can only be increased up to the extent of not causing the dielectric breakdown of the emitter 202 even though an increase of the number of emitted electrons is tried.

It is therefore an object of the present invention, which is conceived in view of the problems inherent in the aforesaid related art, to provide a dielectric device of higher performance. It is a further object of the present invention to provide a dielectric device wherein the electron emission amount of an electron emitter can be increased by applying the invention to the electron emitter.

In order to achieve the aforesaid objects, the dielectric layer forming the dielectric device according to the present invention includes a first layer which has plural first dielectric particles and a second layer which has plural second dielectric particles having a different average particle size from that of the first particles, the first layer and the second layer being stacked in the thickness direction of the dielectric layer. In this arrangement, since the average particle size of the first dielectric particles forming the first layer is different from the average particle size of the second dielectric particles forming the second layer, it is easy to set the first layer and second layer to have different physical properties. Therefore, a dielectric layer having suitable properties depending on the application of the dielectric device can be easily obtained, and a dielectric device having superior performance can be provided.

In addition to the aforesaid arrangement, according to the present invention, the first layer and/or second layer are formed by an aerosol deposition method from fine particles of a dielectric material. The aerosol deposition method is a method of forming a dense crystallized solid film through the processes of: dispersing powder into a gas and forming a smoky state (aerosol) using vibration or the like; thereafter conveying the formed aerosol to a film forming chamber under a prescribed reduced pressure; and spraying it on a prescribed substrate through a nozzle. According to this aerosol deposition method, the layer which functions as the first and/or second layer has few voids, and a high packing density (e.g., about 90 to 95% of the theoretical density), so the physical properties required of the first and/or second layer can be stably and reliably obtained.

In addition to the aforesaid arrangement, according to the present invention, a metal is further mixed in the dielectric layer.

Specifically, metal particulates and/or a metal film can for example be interposed between adjacent first dielectric particles in the first layer. The aforesaid metal objects such as the metal particulates may also be interposed between adjacent second dielectric particles in the second layer. The aforesaid metal objects such as the metal particulates may also be interposed between first dielectric particles and second dielectric particles at the interface between the first layer and second layer. The aforesaid metal objects such as the metal particulates may also be interposed between the second dielectric particles and the substrate and/or between adjacent second dielectric particles at the interface between the second layer and a predetermined substrate supporting the second layer. Further, any suitable combination of these aspects (i.e. the metal objects are interposed in the first layer and the second layer/in the first layer and first-second layer interface/in the second layer and first-second layer interface/in the second layer and second layer-substrate interface/in the first layer, first-second layer interface, and the second layer/in the first layer, first-second layer interface, the second layer, and the second layer-substrate interface) is also possible.

By filling the voids in the dielectric layer by a metal in this way, the dielectric constant of the dielectric layer can be increased. Also, by making the metal function as a binder using the ductility of the metal, the film of the dielectric layer can be formed satisfactorily.

In this case, the metal is preferably implanted so that it is dispersed (dispersed is discontinuously) throughout the dielectric layer. Here, the term "discontinuously" represents the state wherein gaps exist among metallic fine particles and/or metal films adjacent to each other along the thickness direction so as not to yield electric conductivity over the thickness direction of the dielectric layer (namely from the upper surface to the lower surface of the dielectric layer).

As a result, in addition to a higher dielectric constant and improved film-forming properties, satisfactory properties (dielectric properties such as electrostatic/electron emission properties and electrical-mechanical conversion properties such as piezoelectric/electrostriction properties) in the dielectric layer are obtained.

The present invention moreover includes an emitter having the aforesaid dielectric layer, and first and second electrodes formed on or above the emitter to which a drive voltage is applied to discharge electrons from the emitter's upper surface.

According to this arrangement, the emitter includes a first layer which has plural first dielectric particles and a second layer which has plural second dielectric particles having a different average particle size from that of the first particles, the first layer and the second layer being stacked in the thickness direction of the dielectric layer. When a predetermined drive voltage is applied between the first electrode and second electrode, a predetermined electric field is applied to the emitter having the aforesaid structure, and electrons are emitted from the surface of the emitter. At this time, since the emitter has the aforesaid structure, the first layer and/or second layer of the dielectric layer may be given physical properties such that they emit more electrons from the surface when a predetermined electric field is applied (e.g., surface roughness, dielectric constant, D-E hysteresis properties).

Herein, when the first layer and/or second layer are formed by the aerosol deposition method, heat treatment is preferably given to the first layer and/or second layer at a lower temperature than the ceramic sintering temperature. Due to this heat treatment, the dielectric constant of the first layer and/or second layer formed by the aerosol deposition method increases, so a high-performance electronic device to which a higher electric field can be applied, can be provided. Further, when the first electrode or second electrode forming process includes a step for heating to the aforesaid temperature, the electrode-forming step may conveniently be combined with the heat treatment step to increase the dielectric constant. The aforesaid temperature is more preferably in the region of 500° C. Due to this, the aforesaid dielectric device can be formed even on an economical glass substrate which does not have such a high heat resistance temperature, so when it is applied to an electron emitter of an FED, large screens can be manufactured at low cost.

In the present invention, the first electrode is provided on the upper surface of the emitter, and air gaps are provided between a surface opposite to the upper surface of the emitter and the upper surface of the emitter in an edge of the first electrode. By adopting this configuration, the aforementioned triple junction is formed at a portion different from the tip of the edge of the first electrode (including the outer edge of the first electrode and, in the case where the first electrode has an opening as described later, the inner edge at the opening) and hence the electric field concentrated portion is formed also at the tip of the edge of the first electrode in addition to the aforementioned triple junction. Thereby the number of the electric field concentrated portions serving as electron emission sites increases more than ever and the amount of the emitted electrons at the electron emitter can be increased.

Here, it is preferable to dispose the second electrode to the lower surface side, namely on or above (below) the lower surface opposite with the upper surface of the emitter. Thereby the direction of the electric field applied to the emitter is identical to the thickness direction of the dielectric layer composing the emitter and only the first electrode is formed and disposed on or above the upper surface of the emitter. As a result, the area occupied by the electron emitter on a plan view reduces in comparison with the configuration wherein both the first and second electrodes are formed and disposed on the same surface of the emitter, and thus a higher degree of the integration of electron emitters becomes possible. In the case where electron emitters using the dielectric devices are applied to an FED in particular, the higher resolution of a display can easily be attained.

Further in this case, since an air gap (gap) is formed between the surface of the edge portion of the first electrode opposite to the upper surface of the emitter and the upper surface of the emitter, the electrostatic capacity of the virtual condenser formed between the surface of the edge portion of the first electrode opposite to the upper surface of the emitter and the upper surface of the emitter becomes smaller than that in the case where such a gap is not formed. As a result, most part of the drive voltage is substantially applied to the gap portion, and thus the field intensity at the edge of the first electrode increases and the amount of emitted electrons also increases in comparison with a conventional electron emitter not having such a gap as stated above.

Furthermore, it is preferable that the first electrode is provided with plural openings that expose the upper surface of the emitter toward the exterior of the dielectric device. Thereby triple junctions and the tips at the edge of the first electrode serving as electric field concentrated portions are formed also at the inner edges of the plural openings in addition to the outer edge of the first electrode. As a result, the number of the electric field concentrated portions serving as electron emission sites further increases and thus the amount of emitted electrons at the electron emitter can also be increased. In addition, since the electric field concentrated portions serving as electron emission sites are formed at the outer edge and the plural openings located inside the outer edge in the first electrode, uniform electron emission having less deviation and dispersion in the region occupied by the first electrode can be obtained.

Here, it is particularly preferable that the electron emitter, to which a dielectric device is applied, according to the present invention functions as follows: as the first step, electrons are emitted (supplied) from the first electrode to the emitter by applying such a drive voltage that the potential of the first electrode is lower than that of the emitter, namely electrons are accumulated on the emitter (the emitter is electrified); and as the second step, the electrons already accumulated on the emitter are emitted by applying such a drive voltage that the potential of the first electrode is higher than that of the emitter. This sort of functions can be carried out in the following state for example.

As the drive voltage applied between the first and second electrodes, for example the voltage which is applied as pulse voltage or alternating voltage relative to a prescribed reference potential (for example, 0 V) is used.

Firstly, at the first step, a drive voltage is applied between the first and second electrodes so that the potential of the first electrode is lower than that of the reference potential and the potential of the second electrode is higher than that of the reference potential. Then, by the electric field caused by the drive voltage, the polarization of the emitter is directed toward such a direction that positive electric charge appears on the upper surface of the emitter, the electric field concentration occurs at the aforementioned electric field concentrated portions, and electrons are supplied from the first electrode to the emitter. Thereby electrons are attracted toward the positive electric charge appearing on the upper surface of the emitter and thereby accumulate at the portion, on the upper surface of the emitter, corresponding to an opening of the first electrode. That is, the portion, on the upper surface of the emitter, corresponding to the opening at the first electrode is electrified. At this time, the first electrode serves as the supply source of the electrons.

Next, at the second step, the drive voltage changes drastically, and the drive voltage is applied between the first and second electrodes so that the potential of the first electrode is higher than that of the reference potential and the potential of the second electrode is lower than that of the reference potential. Then, by the electric field caused by the drive voltage, the polarization direction of the emitter is reversed and negative electric charge appears on the upper surface of the emitter. Thereby, at the first step, the electrons attached to the portion, on the upper surface of the emitter, corresponding to the opening of the first electrode undergo electrostatic repulsive force caused by the polarization reversal and thereby fly from the upper surface of the emitter, and the flown electrons are emitted outside through the opening.

According to such functions, the amount of electrostatic charge at the emitter can be controlled relatively easily at the first stage and hence controllability that is stable and allows a large amount of electrons to be emitted can be secured. In particular, the configuration formed by disposing the first electrode having an opening on the upper surface of the emitter and the second electrode on the lower surface of the emitter is the most suitable as the configuration of an electron emitter for the functions.

Further, an opening, of the first electrode, secluded from the upper surface of the emitter can function as a gate electrode or a focusing electron lens for the electrons emitted from the upper surface of the emitter and hence the linearity of the emitted electrons can also be improved.

Furthermore, a feature of the present invention is that the edge of the first electrode has such a shape as to concentrate the lines of electric force. Such a shape of an edge as to concentrate the lines of electric force can be implemented, for example: either by disposing a portion having an acute-angled shape on the inner wall surface of the edge in sectional side view; or by attaching to the inner wall surface protrusions or conductive fine particles the size of which is equal to or smaller than the thickness of the first electrode. Otherwise, it can also be implemented by forming the inner wall surface of the edge into a hyperbolic shape (particularly a hyperbolic shape configured so that both the upper end and lower end portions of the edge portion in a sectional side view have acute angles). Otherwise, such a shape of the first electrode as to concentrate the lines of electric force at an edge can also be implemented by various means in addition to the above measures. Thereby the degree of the electric field concentration at the tips of the edges of the first electrode (the outer edge of the first electrode and the inner edge of an opening) rises and the amount of the electrons emitted from the tips to the emitter can be increased.

In addition, a feature of the present invention is that the first electrode is the aggregation of conductive particles having a shape extending in the longitudinal direction in a sectional side view and the conductive particles are arranged so that the longitudinal direction is parallel with the upper surface of the emitter. Thereby it is possible to easily realize such a shape as stated above having an air gap between the face of the edge portion of the first electrode, opposite to the upper surface of the emitter and the upper surface of the emitter (hereunder referred to simply as "overhanging shape" occasionally).

Here, as the conductive particles, composing the first electrode, having a shape extending in the longitudinal direction in a sectional side view, various shapes of particles can be adopted, for example: particles of a scale-like shape, a disc-like shape, a coiled spring-like shape or a hollow cylindrical shape; or particles of, in a sectional side view, a rod-like shape, an acicular shape, a hemispherical shape, an elliptical shape or a semi-elliptical shape. Then the conductive particles are arranged in plurality on the upper surface of the emitter so that the longitudinal direction thereof is along the upper surface of the emitter. In this case, the longitudinal direction is not necessarily parallel precisely with the upper surface of the emitter and it is generally acceptable if the conductive particles are arranged on the upper surface of the emitter in the state of "lying" to the extent of forming the gap or overhanging shape causing such functions as described earlier. For example, it is preferable that an angle between the longitudinal direction of the conductive particles and the upper surface of the emitter in a sectional side view is about 30 degrees or less.

Further, in the case where the first electrode has an opening, it is preferable that the opening is formed by the outer edges of plural conductive particles. That is, merely by arranging the conductive particles in plurality on the upper surface of the emitter by coating or another means, a space surrounded by the outer edges of the adjacent conductive particles in a plan view is formed and thus the opening having the aforementioned overhanging shape can easily be formed.

Furthermore, it is preferable that the first electrode is formed by arranging the primary particles of the conductive particles and/or the secondary particles formed by assembling the primary particles in plurality along the upper surface of the emitter and the length of the primary or secondary particles in the longitudinal direction in a sectional side view is larger than the average grain size of the first and second dielectric particles at the upper surface of the emitter. That is, the dielectric layer composing the emitter is generally a polycrystalline material and concavities are likely to form at the crystal grain boundaries or the junctions of the powder particles. Hence, as long as the concavities are utilized, merely by arranging the primary or secondary particles of the conductive particles in plurality on the upper surface of the emitter, the aforementioned overhanging shape can easily be formed.

Still further, it is preferable that the first electrode is comprised of graphite. Here, the graphite powder is conductive particles of a shape having relatively sharp edges, such as a scale-like shape, a flake-like shape or the like. In other words, it has a shape extending in the longitudinal direction in a sectional side view. Hence, by composing the first electrode of the graphite powder, it is possible to easily form gaps (air gaps) between the emitter and the edges of the first electrode, overhanging shape at the edges of the first electrode, and a shape allowing the lines of electric force to concentrate at the edges of the first electrode, as stated above.

Still further, it is preferable that the first electrode further contains conductive fine particles. In addition to that, it is preferable that the conductive fine particles are deposited also on the upper surface of the emitter. Thereby, since the fine particles exist on the upper surface of the first electrode like protrusions, the fine particles can serve as electric field concentrated portions by the effect of the protrusions and hence the sites of electron emission can further be increased.

In addition, it is more preferable that the fine particles are deposited also on the upper surface of the emitter corresponding to the edges of the first electrode. Thereby fine float electrodes including the fine particles are formed on the emitter composed of a dielectric. The float electrodes are suitable for abundantly accumulating electrons emitted from the first electrode to the emitter and can further increase the amount of the emitted electrons at the electron emitter. Consequently, by forming the float electrodes with the fine particles, it becomes possible to form the float electrodes on the upper surface of the emitter through a simple process, for example, a process of coating the upper surface with the fine particles together with the material composing the first electrode when the first electrode is formed on the upper surface of the emitter.

Furthermore, it is preferable that the fine particles are comprised of silver. Thereby it becomes possible to produce the first electrode containing conductive fine particles easily at a low cost. In particular, when graphite is used as the first electrode and a heating process in an atmosphere containing an oxygen gas is included in the process of forming the first electrode, the graphite around fine silver particles is oxidized and eroded during the heating process. Thereby an edge of the first electrode is likely to have a sharp tip or an opening is likely to be formed by the perforation in the interior of the electrode. As a consequence, the electric field concentrated portions further increase and a more preferable electrode shape can be obtained.

Here, the first electrode stated above can be formed on the emitter by the following method.

That is, the first electrode is formed by: preparing paste produced by dispersing in a dispersing medium conductive particles having a shape extending in the longitudinal direction in a sectional side view; forming a film including the paste on the upper surface of the emitter; and heating the film at a temperature lower than the sintering temperature of ceramics (a preferable temperature is around 500° C.).

Thereby (by properly adjusting the viscosity and compounding ratio of the paste), it becomes possible to put conductive particles in the state of "lying" as stated earlier by the effects of the self-weight, the surface energy and others of the conductive particles after the aforementioned film forming and before the heating of the film is finished and to easily produce a preferable electron emitter having gaps (air gaps) between the emitter and the openings of the first electrode and overhanging shapes at the openings of the first electrode. Further, it is possible to combine the process of forming the first electrode and the process of heat-treating the emitter as stated above.

Further, in the above production method, it is preferable to disperse conductive fine particles in the dispersing medium when paste is prepared. Thereby it becomes possible to easily produce an electron emitter having a larger number of electric field concentrated portions and an increased amount of emitted electrons as stated above.

As described above, according to the dielectric device of the present invention, a dielectric device having higher performance can be provided. Further, by applying this dielectric device to an electron emitter, the electron emission amount of the electron emitter can be increased.

DETAILED DESCRIPTION OF THE INVENTION

Preferred embodiments of a dielectric device according to the present invention are hereunder explained referring to drawings. The present embodiments show examples wherein a dielectric device according to the present invention is applied to an electron emission device used as an electron beam source in various devices, using electron beams, such as a display including an FED, an electron beam irradiation device, a light source, an alternative of an LED, electronic parts manufacturing apparatus, and an electronic circuit part.

Figure 1:
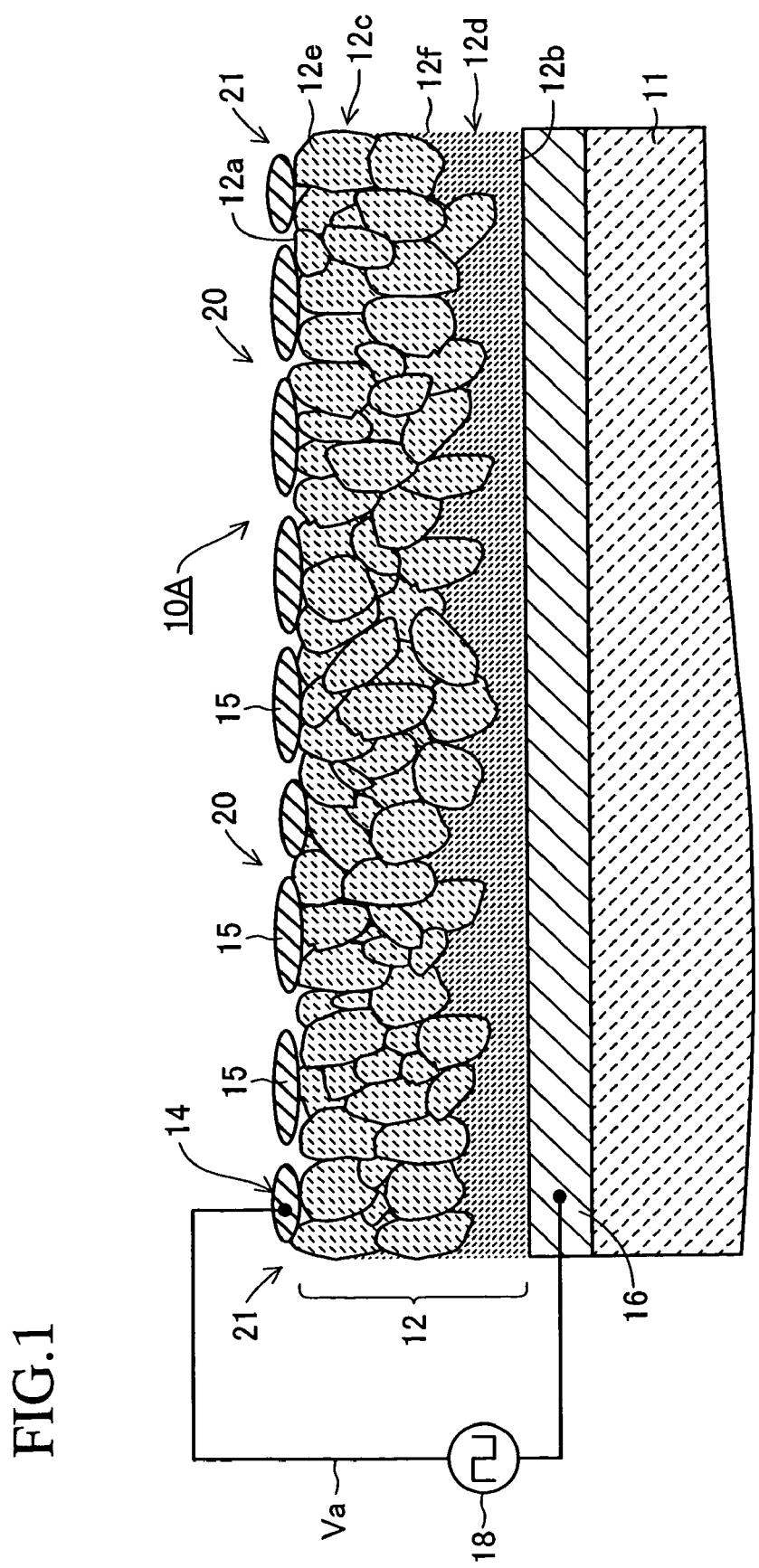
FIG. 1 is a sectional view showing an electron emitter, excluding some portions, according to the first embodiment.

Firstly, an electron emitter as a dielectric device according to the first embodiment is explained on the basis of FIGS. 1 to 8. FIG. 1 is an enlarged sectional side view of an electron emitter 10A according to the present embodiment. The electron emitters 10A are two-dimensionally formed in large numbers on a glass substrate 11 and one of them is shown in FIG. 1. The electron emitter 10A is provided with: a tabular emitter 12; an upper electrode 14 as a first electrode formed on or above the upper surface 12a of the emitter 12 and equipped with openings 20; and a lower electrode 16 as a second electrode formed on the glass substrate 11 and disposed so as to have contact with the lower surface 12b as the second surface of the emitter 12.

The emitter 12 is formed of a polycrystalline body having a dielectric as material, and it has a two-layer construction including an upper layer 12c and a lower layer 12d joined to the underneath of the upper layer 12c formed on the lower electrode 16. The upper surface of the upper layer 12*c* forms the upper surface 12*a* of the emitter 12. The upper layer 12*c* is formed of plural dielectric particles 12*e*.

As mentioned above, the upper surface of the upper layer 12*c* forms the upper surface 12*a* of the emitter 12 which has the role of emitting electrons when a predetermined electric field is applied. Concerning the dielectric particles 12*e* which form the upper layer 12*c*, if the particle size is too small, crystal grain boundary and other defects increase and the relative dielectric constant falls, so the applied field strength decreases which is undesirable. Hence, the amount of coarse particles having a particle size of micron order is preferably as large as possible. The particle size distribution of these dielectric particles 12*e* preferably includes 30% or more of particles having a particle size of 1 μm or more, more preferably includes 50% or more of particles having a particle size of 1 μm or more, and still more preferably includes 50% or more of particles having a particle size of 2 μm or more in the cross-sectional view of the emitter 12. Here, the above particle sizes and proportions are the values calculated by subjecting a section to image analysis and, for example, the particle size of each particle is determined by regarding the diameter of a circle which has the same area as the relevant particle as the particle size and the proportion is determined as the value obtained by calculating the distribution of the particle sizes through the area standard.

The lower layer 12*d* includes plural dielectric particles 12*f* having a smaller average particle size than the dielectric particles 12*e*. This lower layer 12*d* is formed on the metal lower electrode 16 which is formed beforehand on the glass substrate 11, the upper layer 12*c* being supported on the lower layer 12*d*. Specifically, the lower layer 12*d* must adhere to the metal lower electrode 16 with sufficient strength, and adhere firmly to the upper layer 12*c* so that there are no cracks or other defects between this layer and the upper layer 12*c*. Therefore, the dielectric particles 12*f* forming the lower layer 12*d*, unlike the dielectric particles 12*e*, are preferably particulates of sub-micron order having a narrow particle size distribution.

The thickness of the emitter 12 is determined in relation to a drive voltage so that the polarization of the emitter 12 is reversed and field intensity is applied up to the extent of not causing the dielectric breakdown when a drive voltage is applied between the upper electrode 14 and the lower electrode 16. For example, assuming that the dielectric breakdown voltage of the emitter 12 is 10 kV/mm or more, when an applied drive voltage is 100 V, the necessary thickness of the emitter 12 is 10 μm or more theoretically, but it is preferable to set the thickness of the emitter 12 at about 20 μm in consideration of the allowance enough to avoid the dielectric breakdown.

Figure 2:
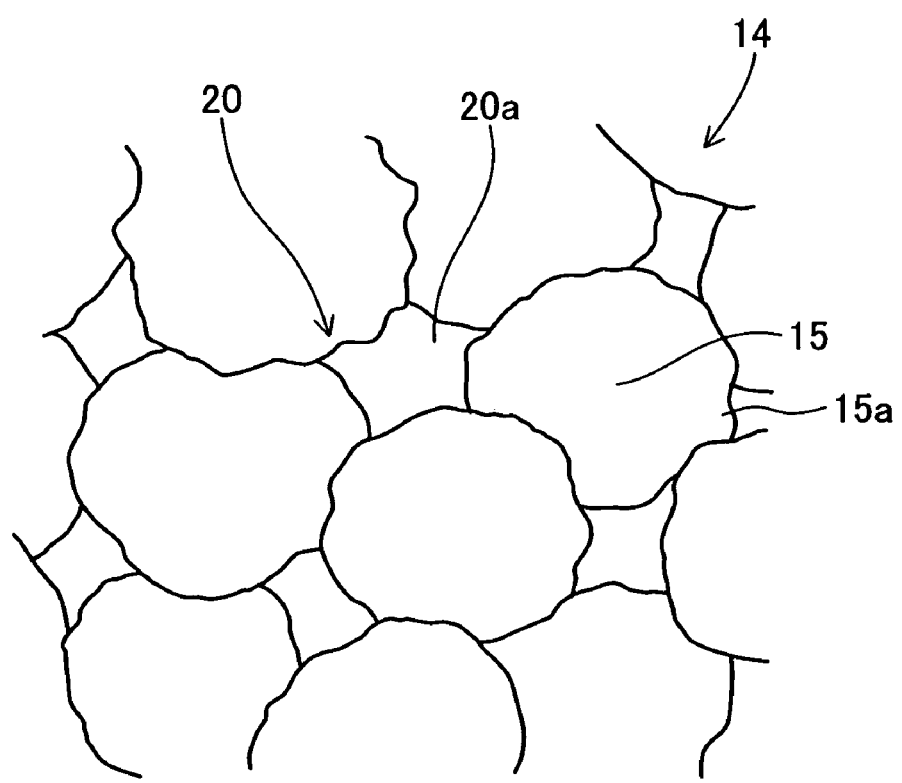
FIG. 2 is an enlarged sectional view showing the main part of the above electron emitter.

The upper electrode 14 is formed so that the thickness thereof is in the range from 0.1 to 20 μm and has plural openings 20 through which the upper surface 12*a* of the emitter 12 is exposed to the exterior. As shown in FIG. 2, the upper electrode 14 is composed of many conductive particles 15 (for example graphite) of a scale-like shape. That is, the upper electrode 14 is formed so that the many conductive particles 15 are disposed in a "lying" state wherein the longitudinal direction of the conductive particles 15 is along the upper surface 12*a* of the emitter 12 in a sectional side view. More specifically, the conductive particles 15 are disposed on the upper surface 12*a* of the emitter 12 so that the angle between the longitudinal direction of the conductive particles 15 and the upper surface 12*a* (smooth virtual surface formed by averaging the unevenness in the join parts between adjacent dielectric particles 12*e* or crystal grain boundaries) of the emitter 12 is 30 degrees or less in a sectional side view. In the present embodiment, the conductive particles 15 are comprised of the particle which size of the primary particle (the longest length thereof in the longitudinal direction in a sectional side view) is larger than the particle size of the dielectric composing the emitter 12. In the example of FIG. 1, if the average particle size of the dielectric particles 12*e* in the emitter 12 is in the vicinity of 1 to 2 μm as described above, the size of the first order particles of the electrically conductive particles 15 may be approximately 3 μm or more.

As it is obvious from FIGS. 1 and 2, the many conductive particles 15 composing one upper electrode 14 maintain the conductivity by overlapping each other. Then the openings 20 are formed by the outer edges 15*a* of the many conductive particles 15 in a plan view. In other words, the apertures 20*a* of the openings 20 are the spaces surrounded by the outer edges 15*a* of the plural conductive particles 15.

The lower electrode 16 is composed of a metal thin film and a desirable thickness thereof is 20 μm or less, more desirably 5 μm or less. Then, a pulse generator 18 to apply drive voltage Va between the upper electrode 14 and the lower electrode 16 is connected to the upper electrode 14 and the lower electrode 16.

The electron emitter 10A is actuated in a prescribed vacuum atmosphere and, for example, a desirable vacuum level in the atmosphere (in particular the space above the upper surface 12*a* of the emitter 12 in FIG. 1) is in the range from $10^2$ to $10^{-6}$ Pa, more desirably $10^{-3}$ to $10^{-5}$ Pa. Then the electron emitter 10A is configured so as to accumulate the electrons supplied from the upper electrode 14 on the upper surface 12*a* of the emitter 12 corresponding to the openings 20 and thereafter emit the electrons accumulated on the upper surface 12*a* to the outer atmosphere (the upper side in FIG. 1) through the openings 20.

Figure 3:
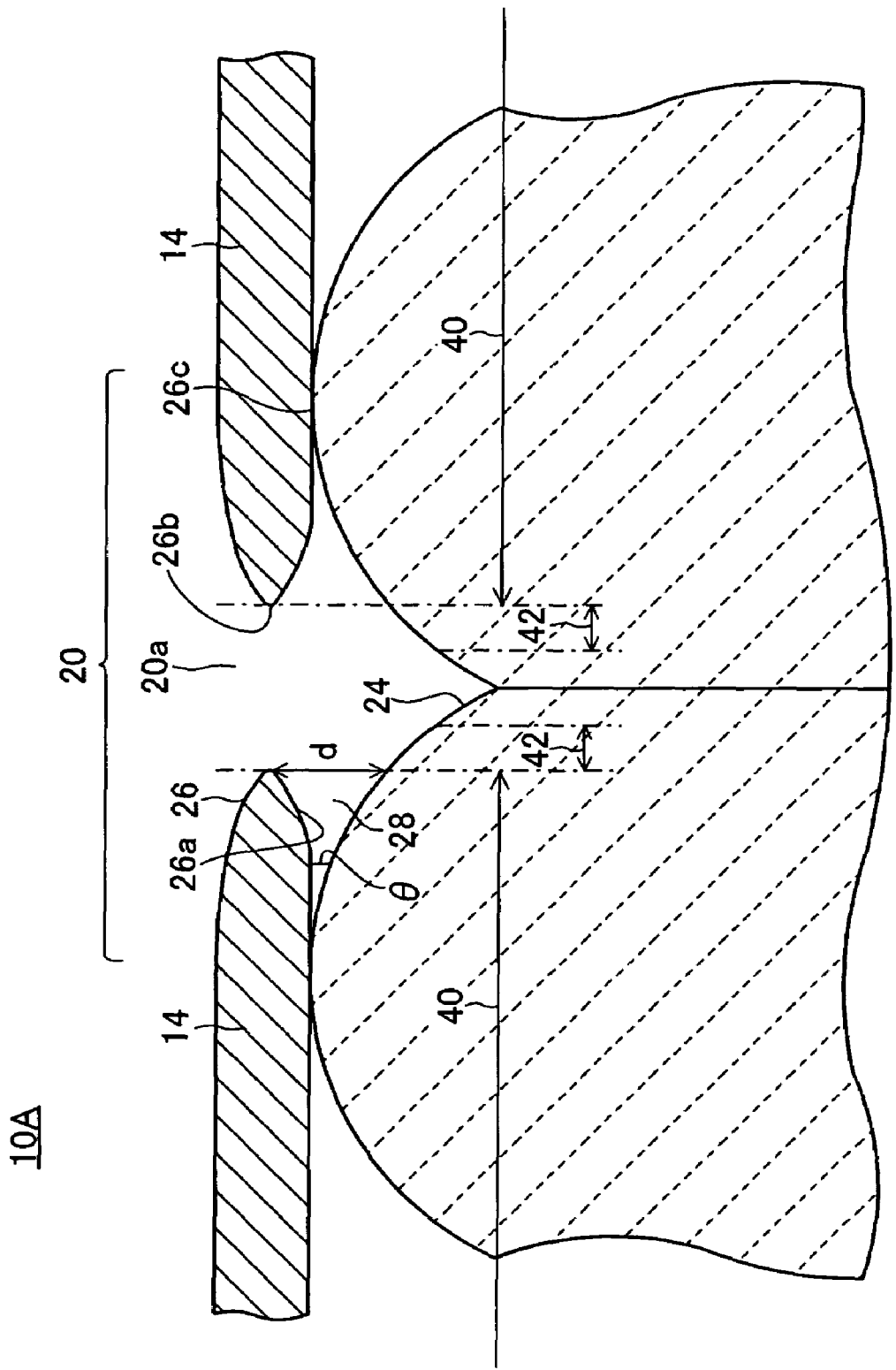
FIG. 3 is a plan view showing an example of the shape of an opening formed at an upper electrode.

As described above, the upper layer 12*c* of the emitter 12 is a polycrystalline body including the plural dielectric particles 12*e*, so on the upper surface 12*a* of the emitter 12, microscopic unevenness are formed in the join parts between the adjacent dielectric particles 12*e* or crystal grain boundaries, and as shown in FIG. 3, a concavity 24 is formed on the upper surface 12*a* of the emitter 12 (in FIG. 3 and subsequent figures, the shapes of the emitter 12 and its upper surface 12*a* are simplified). Then the openings 20 of the upper electrode 14 are formed at the portions corresponding to the concavities 24. FIG. 1 shows an example of the case where one opening 20 is formed for one concavity 24, but there are some cases where one opening 20 is formed for plural concavities 24.

Further, as shown in FIG. 3, an opening 20 is composed of the aperture 20*a* surrounded by the inner edge of the opening 20 and the periphery 26 which is the surroundings of the aperture 20*a*. Then in the upper electrode 14, the face 26*a*, of the periphery 26 of the opening 20, opposite to the emitter 12 is isolated from the emitter 12. In other words, in the upper electrode 14, a gap 28 is formed between the face 26*a*, of the periphery 26 of the opening 20, opposite to the emitter 12 and the emitter 12, and the periphery 26 of the opening 20 in the upper electrode 14 is formed into the shape of an overhang (hence in the explanations below, the term "the periphery 26 of the opening 20 in the upper electrode 14" is described as "the overhang 26 of the upper electrode 14," and the term "the face 26*a*, of the periphery 26 of the opening 20 in the upper electrode 14, opposite to the emitter 12" is described as "the lower face 26*a* of the overhang 26 in the upper electrode 14"). Then as it is obvious from FIGS. 2 and 3, the overhang 26 is composed of the edges 15*a* of the plural conductive particles 15.

Here, in the present embodiment, the maximum angle θ between the upper surface 12a (the face in the vicinity of the top of the convex portion of a jog) of the emitter 12 and the lower face 26a of the overhang 26 in the upper electrode 14 is set so as to satisfy the expression 1°≦θ≦60°. Also, the maximum distance d in the vertical direction between the upper surface 12a of the emitter 12 and the lower face 26a of the overhang 26 in the upper electrode 14 is set so as to satisfy the expression 0 μm<d≦10 μm.

Then a triple junction (a triple point where an upper electrode 14, an emitter 12, and vacuum have contact with each other) 26c is formed at a portion where the upper surface of the emitter 12, the upper electrode 14 and the medium surrounding the electron emitter 10A (for example vacuum) contact. Then the triple junction 26c is the place (electric field concentrated portion) where the lines of electric force concentrate (electric force concentration) when drive voltage Va is applied between the upper electrode 14 and the lower electrode 16. Here, "the place where the lines of electric force concentrate" means the place where the lines of electric force originated from the lower electrode 16 at equal intervals concentrate when the lines of electric force are drawn assuming that the upper electrode 14, the emitter 12 and the lower electrode 16 are the flat plates extending infinitely in a sectional side view. The state of the accumulation of the lines of electric force (electric force concentration) can easily be simulated by the numerical analysis using the finite element method.

Further, in the present embodiment, the opening 20 is formed so that the inner edge 26b of the opening 20 serves as an electric field concentrated portion. More specifically, the overhang 26 of the opening 20 is formed so as to sharply protrude at an acute angle toward the inner edge 26b which is the tip of the overhang 26 (so as to reduce the thickness gradually) in a sectional side view. The upper electrode 14 having an opening 20 of such a shape can be formed by a simple method, namely, as stated above, by disposing the conductive particles 15 having a shape extending in the longitudinal direction in a sectional side view in the state of "lying" so that the longitudinal direction of the conductive particles 15 is along the upper surface 12a of the emitter 12 in a sectional side view. Note that, the electric field concentrated portion at the inner edge 26b of the opening 20 and the triple junction 26c as stated above are also formed at positions corresponding to the outer edges 21 at the outer periphery of the upper electrode 14 (refer to FIG. 1).

Here, each of the openings 20 is formed so that it has the aperture 20a the diameter of which, the diameter being represented by the diameter of a virtual circle having the same area as the aperture 20a in a plan view, is in the range from 0.1 μm to 20 μm in average. The reasons are as follows.

As shown in FIG. 3, the portions, of the emitter 12, where polarization is reversed or changed in accordance with the drive voltage Va applied between the upper electrode 14 and the lower electrode 16 (refer to FIG. 1) are the portions immediately under the portions (first portions) 40 where the upper electrode 14 is formed and the portions (second portions) 42 corresponding to the regions from the inner edge (inner periphery) of the opening 20 toward the inner direction of the opening 20. In particular, the region of electron emission at the second portions 42 varies in accordance with the level of the drive voltage Va and the degree of the electric field concentration at the portions. Then when the average diameter of the aperture 20a is within the range from 0.1 μm to 20 μm in the present embodiment, a sufficient amount of electrons emitted at the opening 20 can be secured and electrons can be emitted efficiently. In other words, when the average diameter of the aperture 20a is less than 0.1 μm, the area of the second portions 42 which is the main region contributing to the accumulation and emission of electrons supplied from the upper electrode 14 becomes small and thus the amount of the emitted electrons decreases. In contrast, when the average diameter of the aperture 20a exceeds 20 μm, the proportion (share) of the area of the second portions 42 to the area of the portion, of the emitter 12, exposed through the opening 20 decreases and thus the efficiency of the electron emission lowers.

Figure 4:
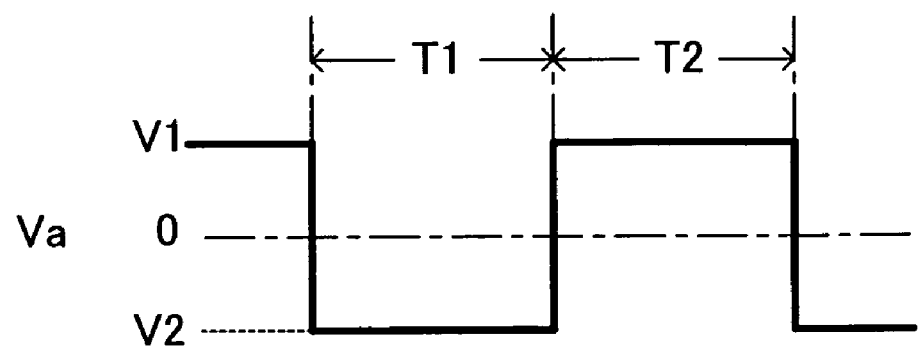
FIG. 4 is a diagram showing a voltage wave form of drive voltage applied to the above electron emitter.

Next, the principle of electron emission in an electron emitter 10A is explained on the basis of FIGS. 4 to 6. In the present embodiment, as shown in FIG. 4, the drive voltage Va applied between the upper electrode 14 and the lower electrode 16 takes the shape of a rectangular wave the cycle of which is T1+T2 so that, with the reference voltage being 0 V, at the first step of the duration T1, the drive voltage is V2 which means that the potential of the upper electrode 14 is lower than that of the lower electrode 16 (negative voltage) and, at the succeeding second step of the duration T2, the drive voltage is V1 which means that the potential of the upper electrode 14 is higher than that of the lower electrode 16 (positive voltage).

Figure 5A:
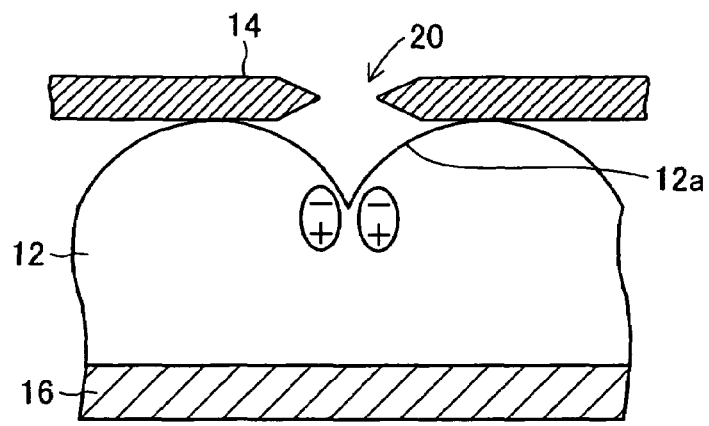
FIG. 5A to 5C include explanatory views showing the aspect of the behavior of the above electron emitter.

The principle is further explained on the assumption that, in the initial state, the emitter 12 is polarized in one direction and for example the negative pole of a dipole is in the state of being directed to the upper surface 12a of the emitter 12 (refer to FIG. 5A).

Firstly, in the initial state wherein the reference voltage is applied, as shown in FIG. 5A, since the negative pole of a dipole is in the state of being directed to the upper surface 12a of the emitter 12, electrons are in the state of scarcely accumulated at the upper surface 12a of the emitter 12.

Figure 5B:
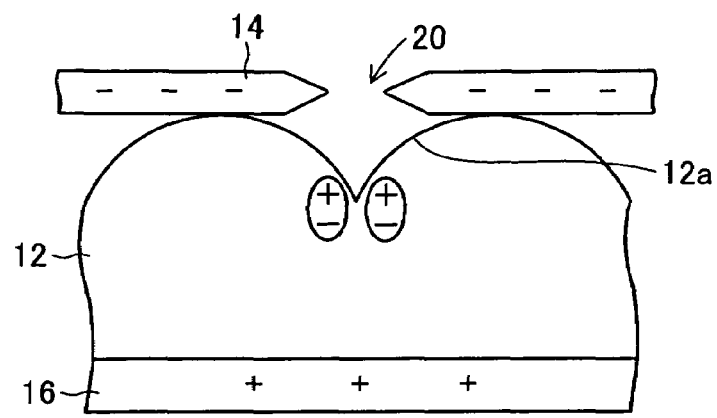
Figure 5C:
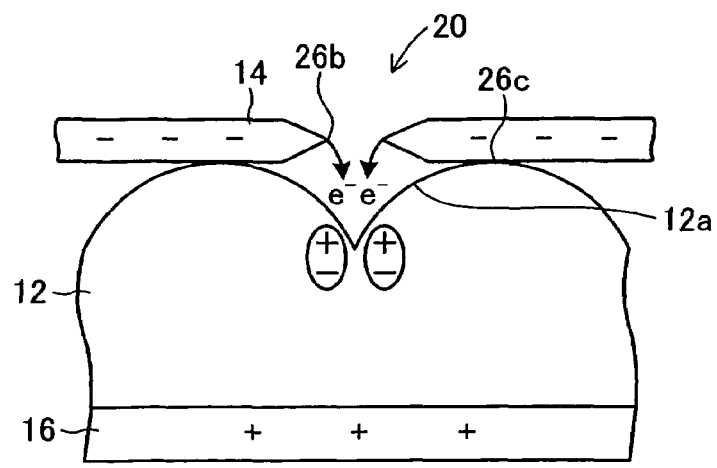

Thereafter, when the negative voltage V2 is applied, the polarization is reversed (refer to FIG. 5B). By the polarization reversal, electric field concentration is caused at the inner edge 26b and the triple junction 26c serving as the electric field concentrated portions, electrons are emitted (supplied) from the electric field concentrated portions at the upper electrode 14 to the upper surface 12a of the emitter 12, and electrons are accumulated, for example, at the portion, of the upper surface 12a, exposed through the opening 20 of the upper electrode 14 and the portion in the vicinity of the overhang 26 of the upper electrode 14 (refer to FIG. 5C). That means the upper surface 12a is electrified. The electrification can last until a certain saturated state appears due to the value of electric surface resistance of the emitter 12 and the amount of the electrification can be controlled by the time during which control voltage is applied. In this way, the upper electrode 14 (the electric field concentrated portions in particular) serves as the supply source of electrons to the emitter 12 (the upper surface 12a).

Figure 6A:
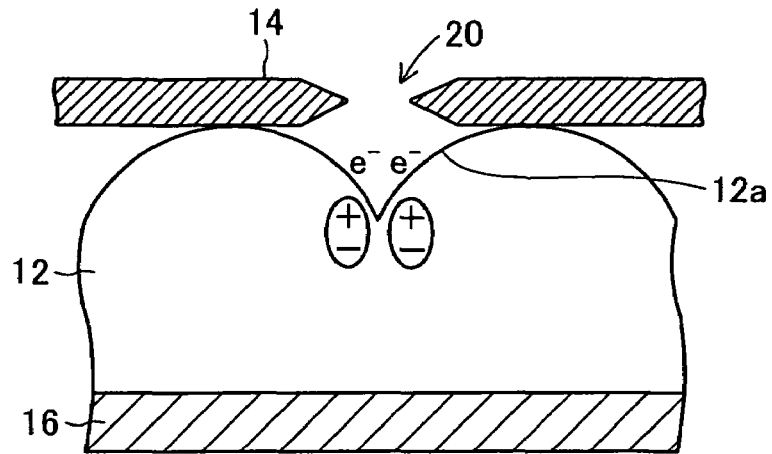
FIG. 6A to 6C include other explanatory views showing the aspect of the behavior of the above electron emitter.
Figure 6B:
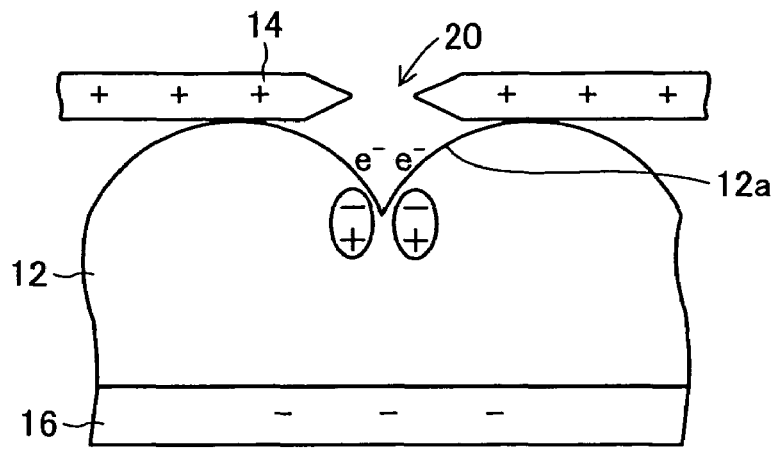
Figure 6C:
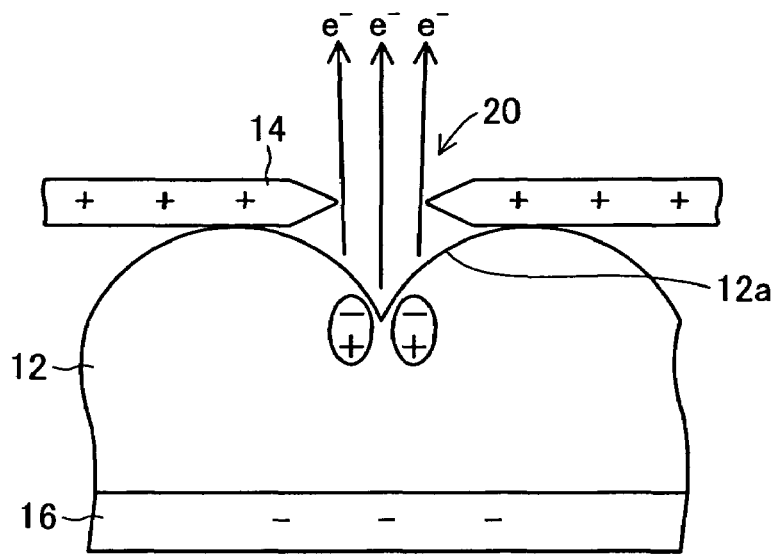

Thereafter, when the negative voltage V2 returns to the reference voltage again as shown in FIG. 6A and then positive voltage V1 is applied, the polarization is reversed again (refer to FIG. 6B) and the electrons accumulated on the upper surface 12a are emitted outside through the aperture 20a by the coulomb repulsive force caused by the negative pole of the dipole (refer to FIG. 6C).

Here, also at the outer edge of the outer periphery, of the upper electrode 14, where no opening 20 is formed, electrons are discharged in the same way as described above.

Figure 7:
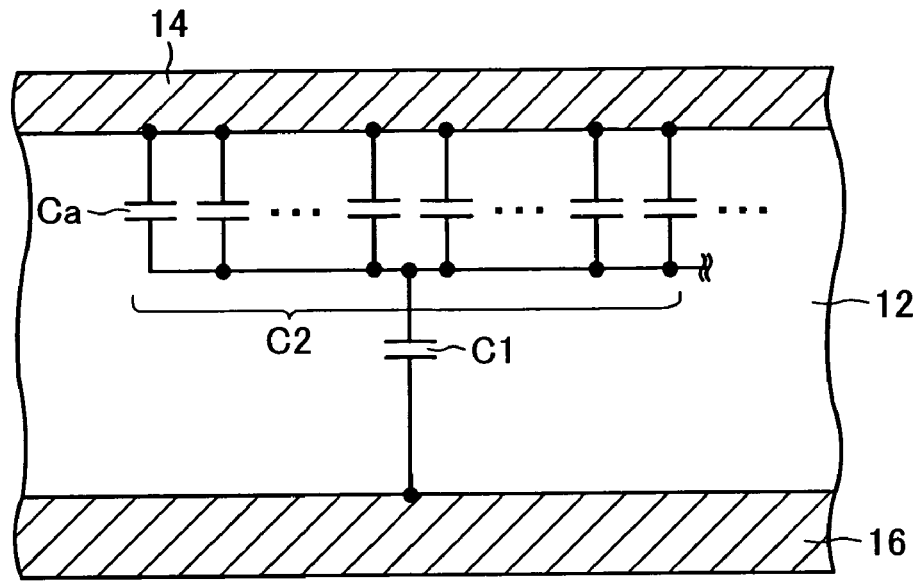
FIG. 7 is an equivalent circuit diagram explaining the influence of forming gaps between an upper electrode and an emitter on the electric field between the upper electrode and a lower electrode.

Further, in the present embodiment, as shown in FIG. 7, in an electrical behavior, a condenser C1 caused by the emitter 12 and an integrated condenser including plural condensers Ca caused by the gaps 28 are formed between the upper electrode 14 and the lower electrode 16. That is, the plural condensers Ca caused by the gaps 28 are integrated as one condenser C2 formed by connecting each other in parallel and, in terms of an equivalent circuit, that takes the form of serially connecting the condenser C1 caused by the emitter 12 to the integrated condenser C2.

In actual operation, the condenser C1 caused by the emitter 12 is not serially connected to the integrated condenser C2 as it is and the components of the serially connected condensers vary in accordance with the number of the formed openings 20 of the upper electrode 14, the overall formed area and others.

Figure 8:
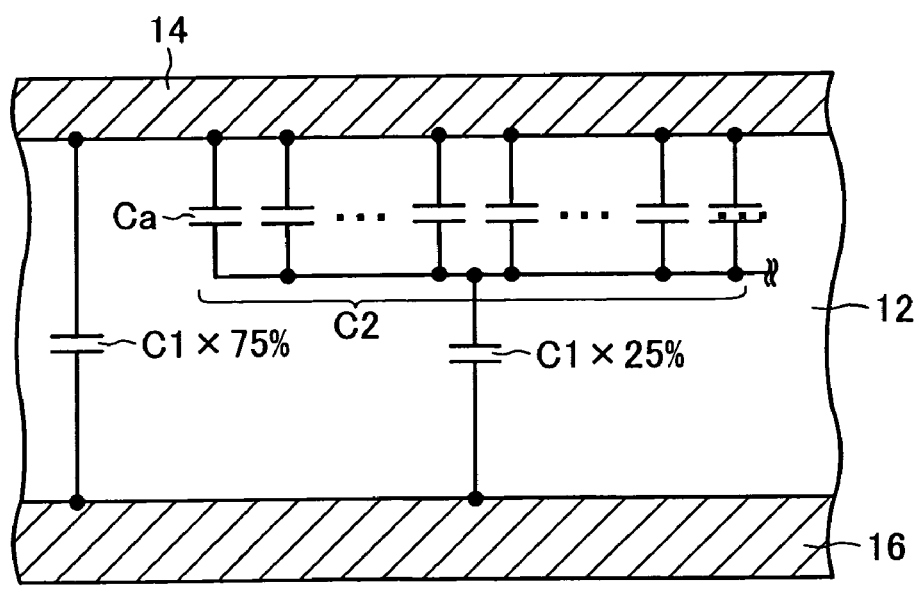
FIG. 8 is another equivalent circuit diagram explaining the influence of forming gaps between the upper electrode and the emitter on the electric field between the upper electrode and the lower electrode.

Here, as shown in FIG. 8, it is attempted to calculate the capacitance on the assumption that for example 25% of the condenser C1 caused by the emitter 12 is serially connected to the integrated condenser C2. Firstly, the relative dielectric constant is one since the portions of the gaps 28 are vacuum. Then the maximum length d of the gaps 28 is set at 0.1 μm, the area S of the portion of one gap 28 is set at 1 μm×1 μm, and the number of the gaps 28 is set at 10,000 pieces. Further, setting the relative dielectric constant of the emitter 12 at 2,000, the thickness of the emitter 12 at 20 μm, and the area of the opposing faces of the upper electrode 14 and the lower electrode 16 at 200 μm×200 μm, the capacitance of the integrated condenser C2 is 0.885 pF and the capacitance of the condenser C1 caused by the emitter 12 is 35.4 pF. Then, when the part, of the condenser C1 caused by the emitter 12, serially connected to the integrated condenser C2, is assumed to be 25% of the total, the capacitance of the portion connected in series (the capacitance including the capacitance of the integrated condenser C2) is 0.805 pF and the remaining capacitance is 26.6 pF.

Since the portion connected in series and the remaining portion are connected to each other in parallel, the overall capacitance is 27.5 pF. The capacitance corresponds to 78% of the capacitance 35.4 pF of the condenser C1 caused by the emitter 12. It means that the overall capacitance is smaller than the capacitance of the condenser C1 caused by the emitter 12.

In this way, with regard to the integrated capacitance of the condensers Ca caused by the plural gaps 28, the capacitance of the condensers Ca caused by the gaps 28 is relatively small and thus most part of the applied voltage Va is applied to the gaps 28 and a high output of electron emission can be secured at the gaps 28 on account of the voltage divided from the condenser C1 caused by the emitter 12.

Further, since the integrated condenser C2 is serially connected to the condenser C1 caused by the emitter 12, the overall capacitance is smaller than the capacitance of the condenser C1 caused by the emitter 12. As a result, preferable effects such as a high electron emission output and a low overall electric power consumption can be obtained.

Next, referring to FIG. 9, the method of manufacturing the electron emitter 10A of this embodiment will be described paying special attention to the method of forming the emitter 12.

Figure 9:
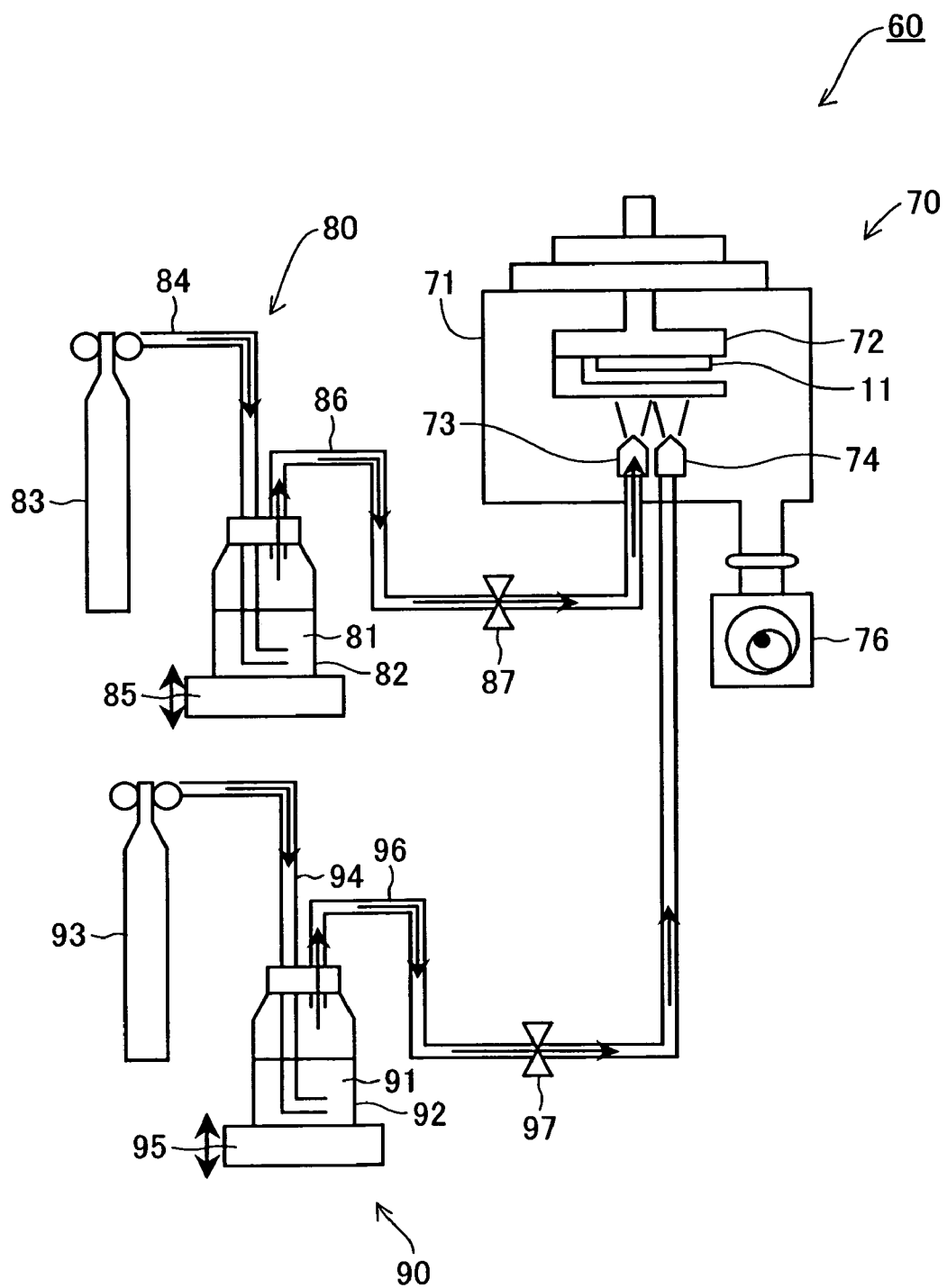
FIG. 9 is a schematic configuration diagram explaining a method of forming the emitter.

FIG. 9 is a schematic view of an aerosol deposition device for forming the emitter 12.

The aerosol deposition equipment 60 is provided with a film forming chamber 70, a first aerosol feeder 80, and a second aerosol feeder 90. The film forming chamber 70 is provided with: a vacuum chamber 71 the interior of which is maintained to a prescribed vacuum level; an X-Y-Z-θ stage 72 that holds a glass substrate 11 in the vacuum chamber 71 and allows the glass substrate 11 to move in an arbitrary direction; a first nozzle 73 and a second nozzle 74 fixed in the vacuum chamber 71 in order to spray aerosol on the glass substrate 11 held on the X-Y-Z-θ stage 72; and a vacuum pump 76 to maintain the interior of the vacuum chamber 71 to a prescribed vacuum level.

The vacuum level in the interior of the vacuum chamber 71 is set at around 50 to 1,000 Pa with the vacuum pump 76. The first nozzle 73 has an opening in the shape of a slit 10 mm×0.4 mm in size and ejects through the opening aerosol supplied from the first aerosol feeder 80 toward the glass substrate 11 in the vacuum chamber 71 having the above vacuum level. The second nozzle 74 has an opening in the shape of a slit 5 mm×0.3 mm in size and ejects through the opening aerosol supplied from the second aerosol feeder 90 toward the glass substrate 11 in the vacuum chamber 71 having the above vacuum level. The glass substrate 11 is transferred in an arbitrary direction by the X-Y-Z-θ stage 72 and thereby, while moving relative to the first nozzle 73 and the second nozzle 74, aerosol is sprayed.

The first aerosol feeder 80 is provided with: a first aerosolizing chamber 82 to store material powder 81; a compressed gas supply source 83 to store a carrier gas used for mixing it with the material powder 81 and generating aerosol in the first aerosolizing chamber 82; a compressed gas feed pipe 84 to feed the carrier gas from the compressed gas supply source 83 to the first aerosolizing chamber 82; a vibration agitator 85 to impose vibration on the first aerosolizing chamber 82 in order to mix the material powder 81 with the carrier gas and aerosolize them in the first aerosolizing chamber 82; an aerosol feed pipe 86 to feed aerosol from the first aerosolizing chamber 82 to the first nozzle 73; and a control valve 87 to control the amount of aerosol ejected from the first nozzle 73 to the glass substrate 11 by adjusting the flow rate of the aerosol in the aerosol feed pipe 86. The second aerosol supply part 90 has an identical construction to the first aerosol supply part 80 excepting that a material powder 91 is used, and it includes a second aerosolizing chamber 92, a compressed gas supply source 93, a compressed gas feed pipe 94, a vibration agitator 95, an aerosol feed pipe 96 and a control valve 97.

The material powder 81 is a relatively coarse dielectric powder having an average particle size of in the range from 1.5 to 5 μm (nominal value by the maker; measured by laser diffractometry or with a Coulter Multisizer (a registered trademark)), and the material powder 91 is a dielectric fine powder having an average particle size of 1 μm (nominal value by the maker; the same as above) or less.

These material powders 81 and 91 are aerosolized by undergoing vibration from the vibration agitator 85 and 95 and thereby being mixed with a carrier gas violently in the first aerosolizing chamber 82 and the second aerosolizing chamber 92. Since the aerosol behaves like a fluid, in the state of opening the control valve 87 and 97, the aerosol flows toward the vacuum chamber 71 due to the pressure difference between the first aerosolizing chamber 82, the second aerosolizing chamber 92 and the vacuum chamber 71 and is ejected toward the glass substrate 11 at a high speed through the first nozzle 73 and the second nozzle 74. Here, as the carrier gas stored in the compressed gas supply source 83, besides compressed air, an inert gas such as a nitrogen gas or a noble gas including a helium gas, an argon gas or the like can be used.

First, when the control valve 87 is closed and the control valve 97 is opened, and the aerosol of the material powder 91 is sprayed on the glass substrate 11, a lower layer 12d is formed on the glass substrate 11 (more precisely, on the lower electrode 16). When subsequently the control valve 97 is closed and the control valve 87 is opened, and the aerosol of the material powder 81 is sprayed on the glass substrate 11, an upper layer 12c is formed on the aforesaid lower layer 12d.

Note that, though situations differ in accordance with the ejection conditions of aerosol, mechanical properties of the material powder 81 and 91, and the like, since those particles of the material powder 81 and 91 are ejected toward the glass substrate 11 and undergo impulsive force when they collide with the glass substrate 11 and the like, the shapes of the particles of the material powder 81 and 91 are generally different from the shapes of the dielectric particles composing the emitter 12 formed on the glass substrate 11 (for example, the first dielectric particles 12e and the second dielectric particles 12f).

As a consequence, the upper layer 12c and lower layer 12d formed by the aerosol deposition method is formed as a very closely packed dielectric thin film of a high packing density and sufficient dielectric properties can be obtained even though sintering at 900° C. or higher is not applied. Hence it becomes possible to form a film at a low temperature of 700° C. or 600° C. or lower. Further, the surface of the upper layer 12c constituting the upper surface 12a of the emitter 12 can also be formed into an arbitrary surface state (surface roughness) in accordance with the film forming conditions of the aerosol deposition method. The dielectric layer formed by aerosol deposition in this way may further be impregnated with a sol in which the dielectric fine particles or their precursor have been dispersed. When this is done, the packing density of the dielectric material and the surface state of the upper surface 12a of the emitter 12 can be adjusted more optimally.

As the dielectric forming the emitter 12 using the material powders 81 and 91, a dielectric of a comparatively high relative dielectric constant, for example 1,000 or more, can preferably be adopted. As such a dielectric, adopted can be, besides barium titanate: a substance such as lead zirconate, lead magnesium niobate, lead nickel niobate, lead zinc niobate, lead manganese niobate, lead magnesium tantalate, lead nickel tantalate, lead antimony stannate, lead titanate, lead magnesium tungstate, or lead cobalt niobate; ceramics containing arbitrary combination thereof; a substance mainly containing a chemical compound composed of those substances by 50 wt. % or more; or a substance produced by further adding to the above ceramics oxides of lanthanum, calcium, strontium, molybdenum, tungsten, barium, niobium, zinc, nickel, manganese, or the like, the combination thereof, or other chemical compounds in an appropriate manner.

For example, in the case of binary system nPMN-mPT (n and m are mole fractions) including lead magnesium niobate (PMN) and lead titanate (PT), by increasing the mole fraction of PMN, the Curie point can be lowered and thus the relative dielectric constant at room temperature can be increased. In particular, the relative dielectric constant is preferably 3,000 or more in the case of n=0.85 to 1.0 and m=1.0−n. For example, a relative dielectric constant of 15,000 can be obtained at room temperature in the case of n=0.91 and m=0.09, and even 20,000 at room temperature in the case of n=0.95 and m=0.05.

Next, in the case of ternary system including lead magnesium niobate (PMN), lead titanate (PT) and lead zirconate (PZ), in addition to the increase of the mole fraction of PMN, to obtain a composition close to the morphotropic phase boundary (MPB) between tetragonal system and pseudo-cubic system or between tetragonal system and rhombohedral system contributes preferably to the increase of a relative dielectric constant. For example, particularly preferably, the relative dielectric constant is 5,500 in the case of PMN:PT:PZ=0.375:0.375:0.25 and the relative dielectric constant is 4,500 in the case of PMN:PT:PZ=0.5:0.375:0.125.

Further, it is preferable to improve a relative dielectric constant by further mixing metal such as platinum with such a dielectric in the range allowing the insulativity to be secured. In this case, it is preferable, for example, to mix platinum by about 20% in weight (about 17% in volume) with a dielectric.

More specifically, for example, metallic fine particles the size of which is larger than that of the dielectric particles 12f and smaller than that of the dielectric particles 12e (for example about 0.01 to 1 µm) are mixed with the material powder 81 and/or 91. Thereby such a structure as shown in FIG. 1 can easily be implemented.

That is, the particle size of the dielectric particles contained in the material powder 81 composing the dielectric particles 12e of the upper layer 12c (hereunder referred to as "coarse particles") is much larger than that of the dielectric particles contained in the material powder 91 composing the dielectric particles 12f of the lower layer 12d (hereunder referred to as "fine particles"). Hence the kinetic energy of the coarse particles when the material powder 81 is sprayed through the nozzle 73 is much larger than the kinetic energy of the fine particles contained in the material powder 81 sprayed through the nozzle 74. Therefore, in some sizes and material quality of the coarse particles, there are cases where almost all of the coarse particles are flicked on the glass substrate 11 (on the lower electrode 16) and on the lower layer 12d which is formed on the glass substrate 11 (on the lower electrode 16). In those cases, not only the lower layer 12d of the coarse particles is hardly formed but also the coarse particles may damage the surface of the glass substrate 11, the surface of the lower electrode 16 and the formed layer on that surface (lower layer 12d or upper layer 12c). To cope with the problem, by mixing the metallic fine particles with the material powder 81 and/or 91 and thus making use of the ductility of metal (making metal work as a binder), the film of the upper layer 12c including coarse particles can be formed satisfactorily on the glass substrate 11.

Here, as metallic fine particles, besides the aforementioned platinum, used can be fine particles of noble metal such as gold, silver or the like, base metal such as nickel, copper, iron or the like, or alloy such as silver-palladium, platinum-rhodium, brass or the like. In the case of alloy, the capability of forming a layer improves by properly adjusting the composition and thus regulating ductility, and therefore it is preferable to use alloy fine particles as the metal fine particles.

Further, a preferable mix rate is 0.01 to 20%, yet preferably 0.05 to 10% in volume.

Figure 10:
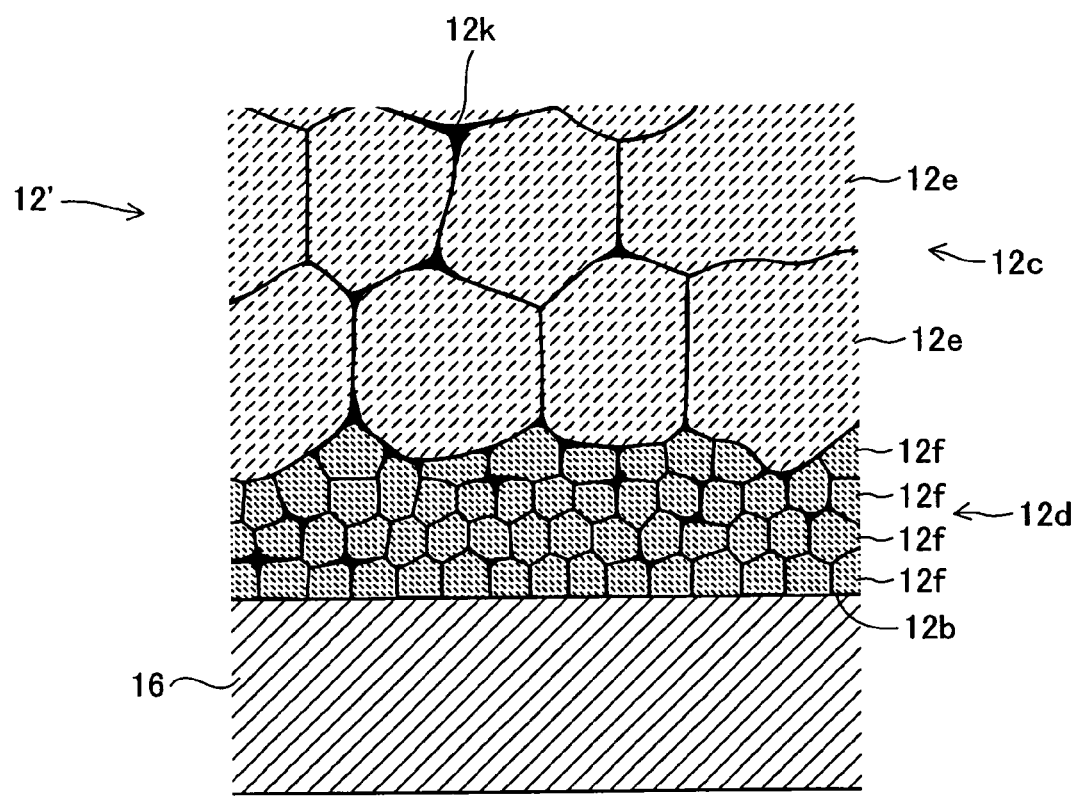
FIG. 10 is a sectional view showing an example of a modified emitter.

FIG. 10 is an enlarged cross-sectional view of an emitter 12' with which a metal has been mixed. As shown in FIG. 10, metal portions 12k are dispersed between the adjacent dielectric particles 12e in the upper layer 12c, between the adjacent dielectric particles 12f in the lower layer 12d, and between the upper layer 12c and lower layer 12d, in the emitter 12' (the dispersion state is such that the particles are discontinuous). The metal portions 12k are also dispersed between the dielectric particles 12f forming the lower layer 12d, and the lower electrode 16 formed on the glass substrate 11.

These metal portions 12k function as a binder between the adjacent dielectric particles 12e in the upper layer 12c, between the adjacent dielectric particles 12f in the lower layer 12d, between the upper layer 12c and lower layer 12d, and between the lower layer 12d and lower electrode 16, which improves the capability of forming the upper layer 12c and lower layer 12d.

Further, by filling the gaps between adjacent dielectric particles 12e and 12f with the metal portions 12k, the dielectric constant of the emitter 12' increases and it becomes possible to realize good dielectric performances at the emitter 12'.

Further, in order not to electrically connect the upper electrode 14 (refer to FIG. 1) to the lower electrode 16 (so that the emitter 12' does not exhibit electrical conductivity in the thickness direction) through plural metal portions 12k, at least one gap is formed appropriately between adjacent plural metal portions 12k in the thickness direction of the emitter 12' (in the vertical direction in the figure). Thereby good dielectric properties (including piezoelectric and electrostrictive properties, electrification and electron emission properties, and the like) can stably be obtained at the emitter 12'.

Further, a piezoelectric and electrostrictive layer, an antiferroelectric layer, or the like can be used as the emitter 12 as stated above and, when a piezoelectric and electrostrictive layer is used as the emitter 12, as such a piezoelectric and electrostrictive layer, adopted can be, for example: a substance such as lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, or lead cobalt niobate; or ceramics containing the arbitrary combination thereof.

It goes without saying that a substance containing those chemical components by 50% or more in weight as the main component can also be used. Among the above ceramics, ceramics containing lead zirconate are most frequently used as a constituent material of a piezoelectric and electrostrictive layer composing the emitter 12.

Further, in the case of composing a piezoelectric and electrostrictive layer of ceramics, used may also be a ceramics produced by further adding to it: oxides of lanthanum, calcium, strontium, molybdenum, tungsten, barium, niobium, zinc, nickel, manganese, or the like; combination of some of them; or other chemical compounds in an appropriate manner. Furthermore, ceramics produced by adding $SiO_2$, $CeO_2$, $Pb_5Ge_3O_{11}$, or combination of some of them to the above ceramics may also be used. More specifically, a material produced by adding $SiO_2$ by 0.2 wt. %, $CeO_2$ by 0.1 wt. %, or $Pb_5Ge_3O_{11}$ by 1 to 2 wt. % to a PT-PZ-PMN system piezoelectric material may preferably be used. For example, it is preferable to use ceramics containing a component including lead magnesium niobate, lead zirconate, and lead titanate as the main component and further containing lanthanum and strontium. A piezoelectric and electrostrictive layer may be either dense or porous and, if porous, a preferable porosity is 40% or less.

In the case of using an antiferroelectric layer as the emitter 12, as the antiferroelectric layer, desirable is: a substance containing lead zirconate as the main component; a substance containing a component including lead zirconate and lead stannate as the main component; a substance produced by further adding lanthanum oxide to lead zirconate; or a substance produced by adding lead zirconate and lead niobate to a component including lead zirconate and lead stannate. Further, the antiferroelectric layer may be porous and, if porous, a preferable porosity is 30% or less.

Further, in the case of using strontium tantalate bismuthate ($SrBi_2Ta_2O_9$) as the emitter 12, polarization reversal fatigue is preferably small. Such a material having small polarization reversal fatigue is a laminar ferrodielectric chemical compound and expressed by the general expression $(BiO_2)^{2+}(A_{m-1}B_mO_{3m+1})^{2-}$. Here, the ions of the metal A are $Ca^{2+}$, $Sr^{2+}$, $Ba^{2+}$, $Pb^{2+}$, $Bi^{3+}$, $La^{3+}$, etc. and the ions of the metal B are $Ti^{4+}$, $Ta^{5+}$, $Nb^{5+}$, etc. Further, it is also possible to render semiconducting capability by further adding an additive to piezoelectric ceramics of a barium titanate system, a lead zirconate system, or a PZT system. In this case, it is possible to allow an uneven electric field distribution to form in an emitter 12 and thus to concentrate electric fields in the vicinity of the interface with the upper electrode 14 that contributes to electron emission.

Furthermore, it is possible to lower the sintering temperature by mixing for example a glass component such as lead borosilicate glass or another low melting chemical compound (for example bismuth oxide or the like) with piezoelectric, electrostrictive and antiferroelectric ceramics.

Yet further, in the case of composing an emitter 12 of piezoelectric, electrostrictive and antiferroelectric ceramics, the shape thereof may be any of a solid sheet, a laminated sheet, or a shape formed by laminating or bonding one of them on a support substrate.

In addition, by using a non-lead type material as the emitter 12 and thus raising the melting point or the transpiration temperature of the emitter 12, the emitter 12 becomes unlikely to be damaged by the collision of electrons or ions.

As the conductive particles 15 composing the upper electrode 14 of the present embodiment, scale-like powder such as scale-like graphite powder or metallic powder, or acicular or rod-like powder such as carbon nanotube is preferably used. As a method for forming the upper electrode 14, used is the method including the processes of: dispersing the scale-like powder (while using a disperser if necessary) into an organic solvent (a binder) such as ethyl cellulose and thus forming paste; applying the paste by spin coating, screen printing, dipping, spraying, or the like and thus forming a thick film of the paste on the upper surface 12a of the emitter 12; and then subjecting the thick paste film to heat treatment. In the case of forming the thick film, when the viscosity of the paste is adjusted to about 100,000 to 200,000 cps so as to be suitable for the thick film forming, a preferable film thickness after printing is considered to be about 1 to 25 μm, more preferably about 3 to 15 μm. If the film thickness is excessive, the size of an opening 20 is too small and inversely, if the film thickness is too thin, the electrical conductivity in an upper electrode 14 cannot be secured. Then after the thick film in the above thickness range is formed, by applying heat treatment, the formed film to be the upper electrode 14 on the emitter 12 is transformed into only the electrode material along with the decomposition of the binder and simultaneously plural openings 20 are formed. As a result, without specific patterning treatment such as masking treatment being applied, plural openings 20 and overhangs 26 are formed in the upper electrode 14 as shown in FIG. 1 and other figures. Here, an inert gas, such as nitrogen, atmosphere is preferably used as the atmosphere during sintering (in particular when a carbonaceous material is used) but atmospheric air or an oxygen atmosphere (including in the decompressed state) can also be used if the compounding ratio of the conductive particles 15 in the paste is properly adjusted.

When the upper electrode 14 is formed, as stated above, it is preferable to add also conductive fine particles 19. As such conductive fine particles 19, besides metallic fine particles, carbonaceous fine particles such as spheroidized graphite powder, carbon black, or the like can be used. When conductive fine particles 19 are added, in addition to metallic fine powder classified into a prescribed particle size range, a substance that can be finally transformed into conductive fine particles by sintering can also be used, for example resinate or the like may be used.

When a carbonaceous material is used as the conductive particles 15 (particularly in an oxygen atmosphere such as the atmospheric air or the like), the temperature at the heat treatment of the upper electrode 14 is preferably 500° C. or lower and further, when conductive fine particles 19 are added, it is necessary to select a temperature at which the conductive fine particles 19 do not aggregation or cause grain growth in excess of a prescribed particle size.

Meanwhile, as the lower electrode 16, a material having electrical conductivity such as metal is used and the lower electrode 16 is composed of platinum, molybdenum, tungsten, or the like. Further, the lower electrode 16 is: composed of a conductor showing resistance to a high-temperature oxidizing atmosphere, such as pure metal, alloy, mixture of insulative ceramics and pure metal, mixture of insulative ceramics and alloy or the like; or preferably composed of high-melting noble metal such as platinum, iridium, palladium, rhodium, molybdenum or the like, a substance mainly composed of alloy such as silver-palladium, silver-platinum, platinum-palladium or the like, or a cermet material composed of platinum and ceramics. More preferably, the lower electrode 16 is composed of platinum only or a material mainly composed of platinum type alloy. Furthermore, as the lower electrode 16, a material of a carbon or graphite type may also be used. Here, the proportion of the ceramic material added to the electrode material is preferably 5 to 30% in volume. It goes without saying that the same material as used for the aforementioned upper electrode may also be used. Then when the lower electrode 16 is made of the aforementioned metal or carbonaceous material, the aforementioned thick film forming method is preferably used.

As described in detail above, in the electron emitter 10A according to the present embodiment, the emitter 12 includes the upper layer 12*c* which forms the upper surface 12*a* of the emitter 12, and the lower layer 12*d* which is joined to it underneath, and it is formed of dielectric particles having a different average particle size in the upper layer 12*c* and lower layer 12*d*. Therefore, the physical/electrical properties required of the upper layer 12*c* and lower layer 12*d* can easily be set to suitable values.

Also, the upper layer 12*c* forming the upper surface 12*a* of the emitter 12 is an aggregation of the plural dielectric particles 12*e*, so microscopic unevenness are formed on the upper surface 12*a* of the emitter 12 by the junction of the adjacent plural dielectric particles 12*e* and 12*f* and crystal grain boundaries and, by utilizing the microscopic unevenness, such overhanging shapes as the aforementioned overhang 26 are easily formed. In particular, merely by arranging the conductive particles 15 having a shape extending in the longitudinal direction in a sectional side view on the upper surface 12*a* of the emitter 12, the aforementioned overhangs 26 are formed easily and abundantly. Also, due to the microscopic unevenness in the upper surface 12*a* of the emitter 12, the surface area of the upper surface 12*a* which has the electron emission function in the emitter 12 is enlarged, and the electron emission amount can be increased.

In particular, by forming the upper layer 12*c* and lower layer 12*d* by the aerosol deposition method, a dielectric thin layer with a high filling factor, low defects, and higher dielectric constant can be obtained by a relatively low temperature process. Hence, it is possible to form an electron emitter 10A on a substrate of a relatively low heat resistance and a low cost, such as a glass substrate or the like, and to realize the upsizing of the screen and the cost reduction of an FED. Further, it is possible to arbitrarily adjust the physical properties of the upper layer 12*c* and/or lower layer 12*d* by properly selecting the film forming conditions of the aerosol deposition method. In addition, by applying heat treatment at 500° C. or lower when the upper electrode 14 is formed, the dielectric constant of the emitter 12 further increases and the electron emission capability improves.

Further, in an electron emitter 10A according to the present embodiment, by forming a overhang 26 at the upper electrode 14, a triple junction 26*c* is formed at a site other than the inner edge 26*b* of the upper electrode. Further, an opening 20 has such a shape as to allow the inner edge 26*b* of the opening 20 to serve as an electric field concentrated portion. Hence it is possible to further increase the number of the electric field concentrated portions than in the case where the overhangs 26 are not formed. In particular, since a overhang 26 in the present embodiment is formed so that it protrudes at an acute angle toward the inner edge 26*b* that is the tip of the overhang 26, the degree of electric field concentration is higher than the case where the shape of the inner edge 26*b* is a right angle or an obtuse angle and it becomes possible to increase the amount of the electrons accumulated on the upper surface 12*a* of the emitter 12.

Furthermore, in the upper surface 12*a* of the emitter 12, the maximum angle θ between the upper surface 12*a* (the face in the vicinity of the top of the convex portion of a jog) of the emitter 12 and the lower face 26*a* of a overhang 26 in the upper electrode 14 is set so as to satisfy the expression $1° \leq θ \leq 60°$ and the maximum distance d in the vertical direction between the upper surface 12*a* of the emitter 12 and the lower face 26*a* of the overhang 26 in the upper electrode 14 is set so as to satisfy the expression $0\,\mu m < d \leq 10\,\mu m$, and by the configuration it becomes possible to increase the degree of the electric field concentration at a gap 28 and thus to increase the amount of the electrons accumulated on the upper surface 12*a* of the emitter 12.

Further, by forming the aforementioned overhang 26, a gap 28 is formed between the lower face 26*a*, opposite to the emitter 12, of the overhang 26 at the opening 20 in the upper electrode 14 and the emitter 12, most part of a drive voltage Va is substantially applied to the gap 28 by the influence of the electrostatic capacity of the virtual condenser at the gap 28, and thus the electric field at the opening 20 is intensified. Thereby it becomes possible to decrease the absolute value of the drive voltage Va required for obtaining the same field intensity at the opening 20.

Further, since the overhang 26 of the upper electrode 14 functions as a focus electron lens or a gate electrode (control electrode), the linearity of the emitted electrons can be improved. This is advantageous to the reduction of cross talk in the case of arraying many electron emitters 10A and using those, for example, as the electron sources of a display.

In addition, as stated above, the openings 20 are formed numerously in a region of the upper electrode 14 in a plan view, and the electric field concentrated portions at the inner edges 26*b* of the openings 20 and the triple junctions 26*c* are also formed numerously in a region of the upper electrode 14 in a plan view (they are formed numerously also at the positions corresponding to the outer edge 21 at the outer periphery (refer to FIG. 1) of the upper electrode 14). Thereby electrons are emitted uniformly without deviation in a region of the upper electrode 14 in a plan view.

Figure 11:
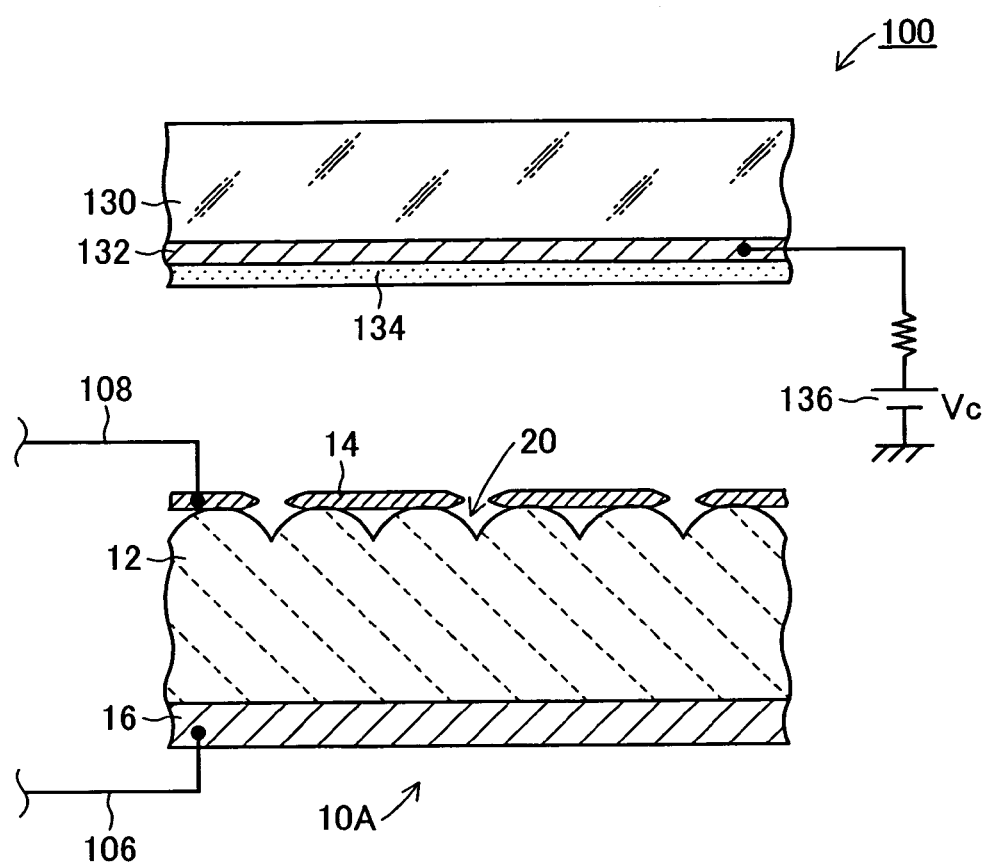
FIG. 11 is a configuration diagram showing an outline of a display to which the above electron emitter is applied.

Next, a display 100 using electron emitters 10A according to the present embodiment is explained on the basis of FIG. 11.

In the display 100, as shown in FIG. 11: a transparent plate 130 made of, for example, glass or acrylic is disposed above the upper electrode 14; a collector electrode 132 composed of, for example, a transparent electrode is disposed on the bottom surface (the face opposite to the upper electrode 14) of the transparent plate 130; and the collector electrode 132 is coated with a phosphor 134. Here, a bias voltage source 136 (collector voltage Vc) is connected to the collector electrode 132 via a resistance. Further, an electron emitter 10A is disposed in a vacuum atmosphere as stated above. The vacuum level in the atmosphere is preferably in the range from $10^2$ to $10^{-6}$ Pa, and more preferably in the range from $10^{-3}$ to $10^{-5}$ Pa.

The reason why such a range is selected is that, if the vacuum level is low, there arise the following risks; (1) since the gas molecules are abundant in the space, plasma tends to be generated and, if plasma is generated in too large quantity, a large number of positive ions collide with the upper electrode 14, resulting in the increase of damages, and (2) the emitted electrons undesirably collide with gas molecules before they reach the collector electrode 132 and the excitation of the phosphor 134 by the electrons fully accelerated by the collector voltage Vc is insufficiently secured.

On the other hand, if the vacuum level is high, though electrons are likely to be emitted from the points where electric fields concentrate, the problem is that the sizes of the supports of the structure and the sealing system for vacuum increase and thus that is disadvantageous for downsizing.

Figure 12:
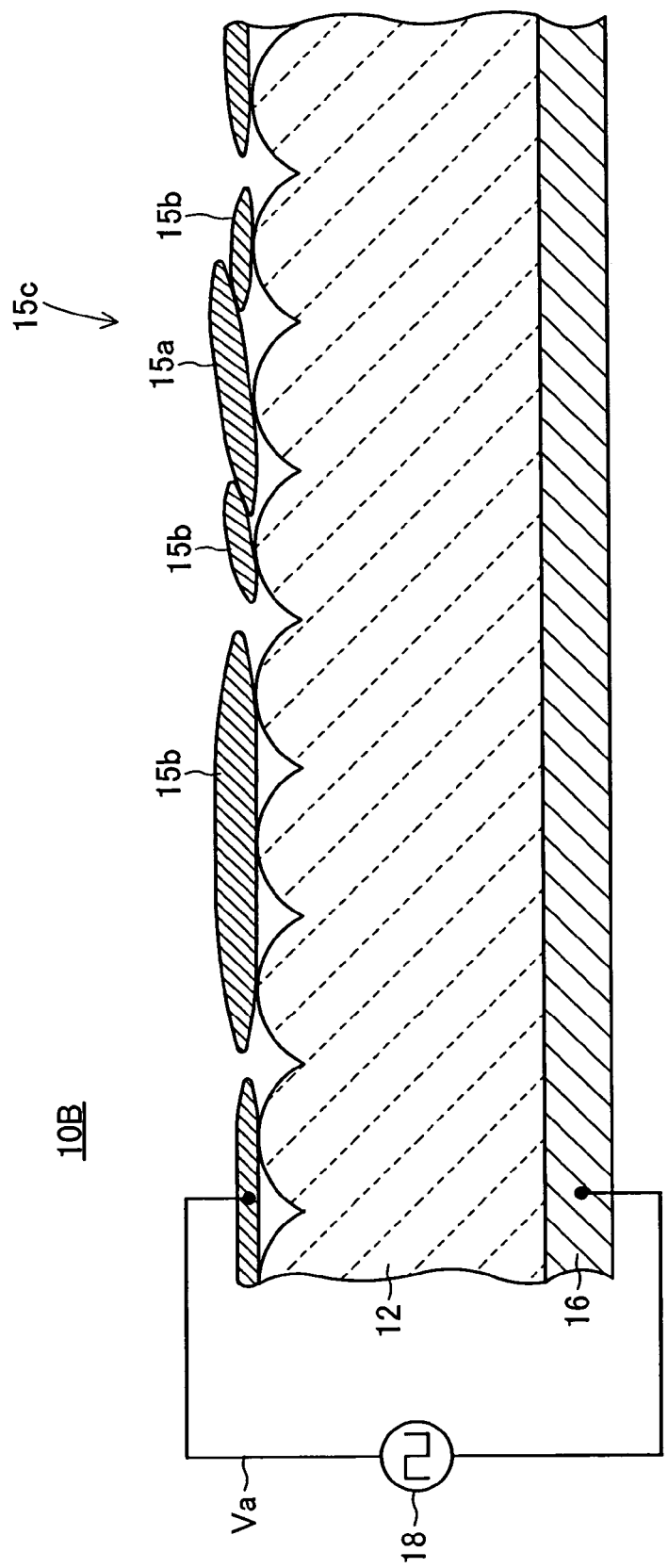
FIG. 12 is a sectional view showing an electron emitter, excluding some portions, according to the second embodiment.

Next, an electron emitter 10B according to the second embodiment is explained referring to FIG. 12. The electron emitter 10B according to the second embodiment has almost the same configuration as the aforementioned electron emitter 10A according to the first embodiment, but the conductive particles 15 composing the upper electrode 14 exist on the upper surface 12a of the emitter 12 not only as the primary particles 15b but also as the secondary particles 15c. Then the specific feature here is that the length of the secondary particles 15c in the longitudinal direction in a sectional side view is larger than the crystal grain size of a polycrystalline material composing the emitter 12. The electron emitter 10B according to the second embodiment has also the same functions and effects as shown by the aforementioned electron emitter 10A according to the first embodiment.

Figure 13:
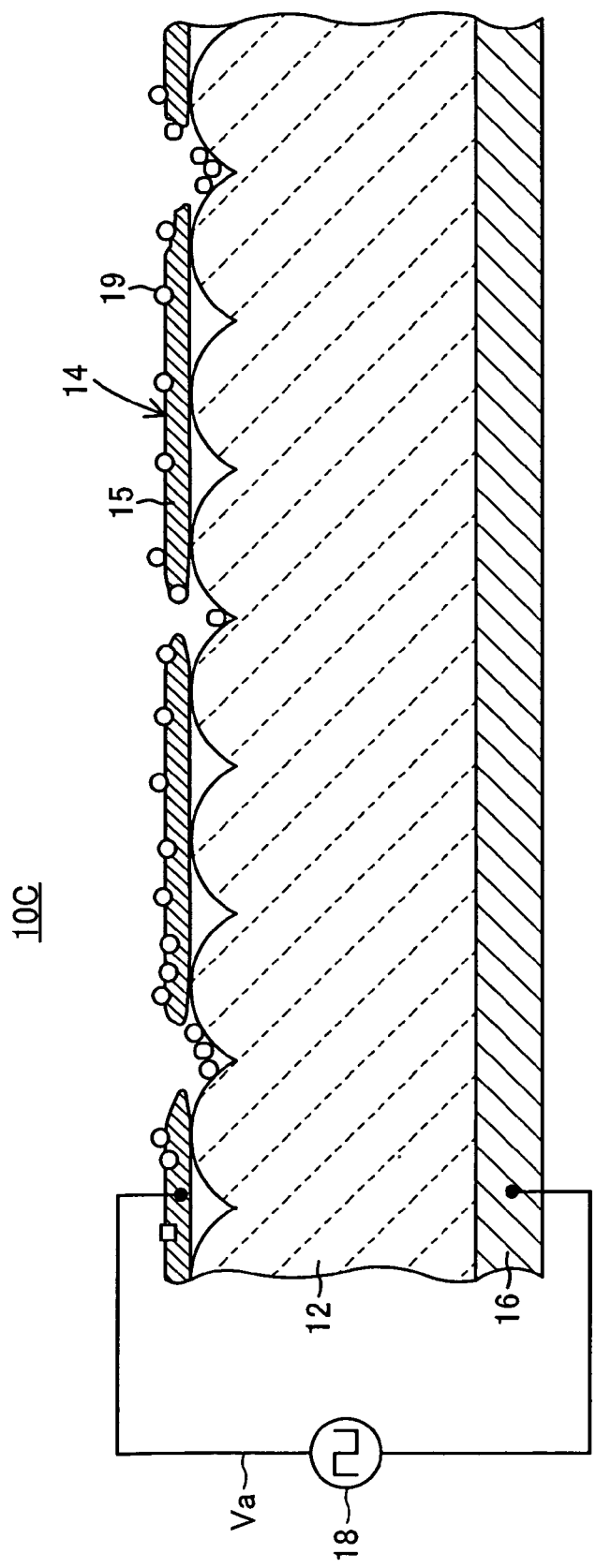
FIG. 13 is a sectional view showing an electron emitter, excluding some portions, according to the third embodiment.

Further, an electron emitter 10C according to the third embodiment is explained referring to FIG. 13. The electron emitter 10C according to the third embodiment has almost the same configuration as the aforementioned electron emitter 10A or 10B according to the first or second embodiment, but the upper electrode 14 is composed of, in addition to the same conductive particles 15 as above, the conductive fine particles 19. It is preferable that the size of such conductive fine particles 19 is nearly equal to or smaller than the thickness (the width thereof in the direction perpendicular to the longitudinal direction in a sectional side view) of the primary particles of the conductive particles 15. For example, when the thickness of the conductive particles 15 is about 2 μm, the average particle size of the conductive fine particles 19 is preferably 1 μm or less, and more preferably 0.5 μm or less. Thereby the electrical conductivity among the conductive particles 15 can easily be secured in the same upper electrode 14.

Here, it is preferable that the conductive fine particles 19 are exposed on the top surface of the upper electrode 14, in particular at the overhangs 26 as shown in FIG. 13. Thereby the conductive fine particles 19 exist like protrusions on the top surface of the upper electrode 14, thus the conductive fine particles 19 also serve as the electric field concentrated portions by the effect of the protruded shape, and hence the number of the sites of supplying electrons to the upper surface 12a of the emitter 12 can further be increased. Further preferably, the conductive fine particles 19 are also deposited on the upper surface 12a of the emitter 12 corresponding to the openings 20. Thereby fine float electrodes including the conductive fine particles 19 are also disposed on the emitter 12 composed of a dielectric material. The float electrodes are suitable for accumulating electrons emitted from the upper electrode 14 toward the emitter 12 in large quantity and can further increase the amount of emitted electrons in the electron emitter. For that reason, by composing the float electrodes of the conductive fine particles 19, as it is stated later, the float electrodes can be formed on the upper surface 12a of the emitter 12 through a simple process of, for example, mixing the conductive particles 15 with the conductive fine particles 19 and applying the mixture on the upper surface 12a of the emitter 12 when the upper electrode 14 is formed on the upper surface 12a of the emitter 12.

Further, when a carbonaceous material (for example graphite) is used as the conductive particles 15 and silver is used as the conductive fine particles 19 and then heating treatment is applied at the time of the forming of the upper electrode 14, during the heat treatment, since the graphite or the like in the vicinity of the silver fine particles is eroded by oxidation, the outer edge of the upper electrode 14 is likely to take the shape having a sharp edge or to have openings caused by perforation inside the electrode. Thereby the electric field concentrated portions further increase and it becomes possible to obtain a more suitable electrode configuration.

An electron emitter 10D according to a fourth embodiment will now be described referring to FIG. 14. In this electron emitter 10D according to the fourth embodiment, a surface layer 12g (first layer) forming a upper surface 12a' of an emitter 12" is provided on the upper layer 12c (second layer) in the electron emitters 10A to 10C according to the aforesaid first to third embodiments, otherwise it has a substantially identical structure to that of the aforesaid embodiments. The surface layer 12g includes plural dielectric particles 12g1. The dielectric particles 12g1 include a dielectric material prepared beforehand by sintering or the like. For example, the dielectric particles 12g1 are of a piezoelectric/electrostrictive ceramics thin plate material which is sintered so that it has predetermined dielectric properties (dielectric properties such as for example piezoelectric/electrostrictive properties or electron emission properties). Specifically, the dielectric particles 12g1 are obtained by for example breaking and/or cutting the previously sintered piezoelectric/electrostrictive ceramics thin plate to a predetermined size.

The size of this dielectric particle 12g is suitably selected according to the surface roughness and flatness of the upper surface 12a' of the upper layer 12c. In order to obtain satisfactory adhesion properties between the upper surface 12a' and surface layer 12g and satisfactory dielectric properties (as few voids as possible) in the emitter 12" even if the surface roughness and flatness of the upper surface 12a' is not so good, the thickness is preferably approximately in the range from 10 to 20 μm, and the particle size (dimensions in the longitudinal direction i.e., the direction perpendicular to the thickness when viewed in lateral cross-section of the emitter 12") is preferably in the range from 20 to 200 μm. The particle size of the dielectric particle 12g is a value obtained by analyzing the scanning electron microscope (SEM) image in an upper plan view and computation, e.g., the value obtained by approximating the particle to a circle having an equivalent area to that of the particle, taking the diameter of this circle as the particle size and computing the particle size distribution in terms of the area.

This surface layer 12g is joined to the upper surface 12a' of the upper layer 12c by, for example, sintering, and is formed in one piece with this upper layer 12c. Specifically, the emitter 12" is obtained by for example forming the lower layer 12d and upper layer 12c on the glass substrate 11, covering the plural dielectric particles 12g1 on the upper surface 12a' of the upper layer 12c formed in this way, and forming a one-piece construction by heat treatment.

Figure 14:
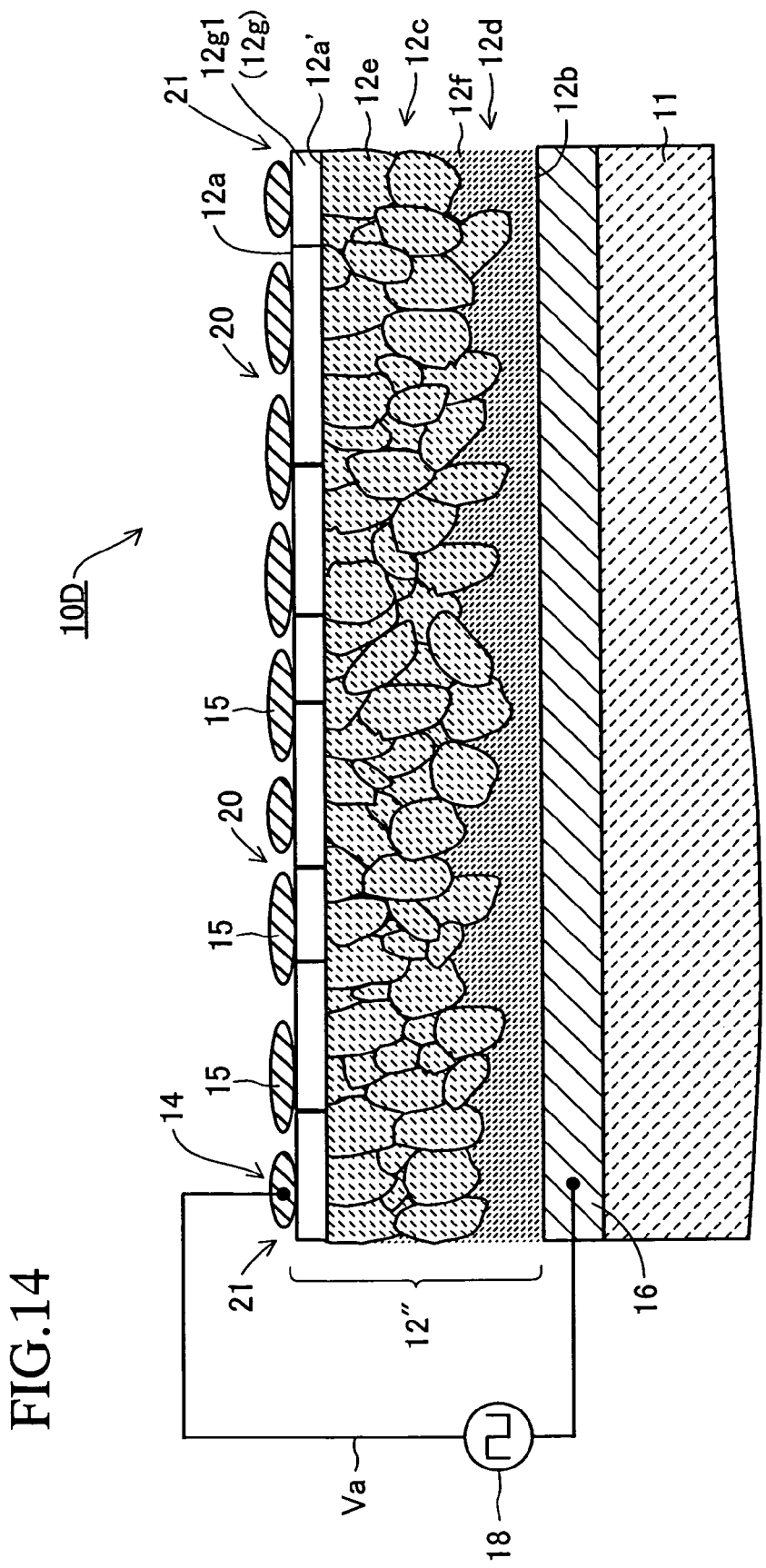
FIG. 14 is a sectional view showing an electron emitter, excluding some portions, according to the forth embodiment.

Herein, if for example the upper layer 12c is formed by the aforesaid aerosol deposition, the upper layer 12c and surface layer 12g can be formed in one piece at a low heat treatment temperature by mixing an additive including glass or metal fine particles with the material powder, and blowing the mixture onto the glass substrate 11 (on the lower layer 12d) so that the additive functions as a binder (if metal fine particles are mixed in, as shown in FIG. 10, the metal portions 12k are dispersed in the upper layer 12c or at the interface between the upper layer 12c and lower layer 12d, but the metal portions 12k can be dispersed also at the interface between the upper layer 12c and surface layer 12g in FIG. 14).

According to the electron emitter 10D of this embodiment having the aforesaid structure, predetermined dielectric properties can be surely implemented on the upper surface 12a of the emitter 12", and very satisfactory electron emission properties are thereby obtained. Depending on the method of forming the upper layer 12c or lower layer 12d, the upper layer 12c may suffer a large electrical/mechanical effect, and the dielectric properties in the vicinity of the upper surface 12a' of the upper layer 12c may be less satisfactory than expected. Hence, in the present embodiment, the upper layer 12c and lower layer 12d function as insulating films of high electric constant. By forming the upper surface 12a' of the emitter 12" by the surface layer 12g having predetermined dielectric properties fixed on the insulating film, an electron emitter (dielectric element) having desired properties can be obtained by a simple manufacturing method.

If the upper surface 12a' of the upper layer 12c is very smooth and flat, the surface layer 12g need not be an aggregation of the plural dielectric particles 12g1, but may be formed from one dielectric thin plate.

Hereinabove, a typical embodiment of the present invention has been described, but it will be understood that the invention is not to be construed as being limited in any way thereby, and various modifications may be made without departing from the scope and spirit thereof.

For example, in the above embodiments, the upper electrode 14 and the lower electrode 16 are formed on the different surfaces (the upper surface and the lower surface) of the emitter 12, but they may be formed on an identical surface (the upper surface).

The emitter 12' containing metal (FIG. 10) can be used in any of the aforesaid embodiments. Here, the metal may be mixed with the material powder 81 and/or 91 by the aforesaid aerosol deposition method, or any desired method such as vapor deposition or coating may be used. In the fourth embodiment (FIG. 14), the upper layer 12c or lower layer 12d may be omitted. In other words, a dielectric layer of the dielectric particles 12e (coarse particles) or a dielectric layer of the dielectric particles 12f (fine particles) may be formed on the glass substrate 11, and the surface layer 12g including the dielectric particles 12g1 may be formed thereupon.

Figure 15:
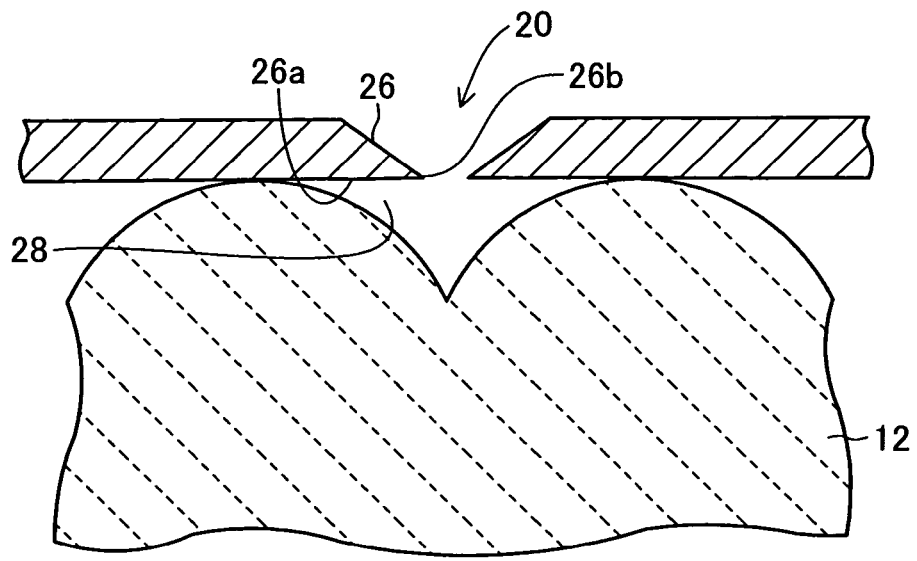
FIG. 15 is a sectional view showing an example of a modified overhanging shape at the upper electrode of the electron emitter according to the aforesaid embodiments.
Figure 16:
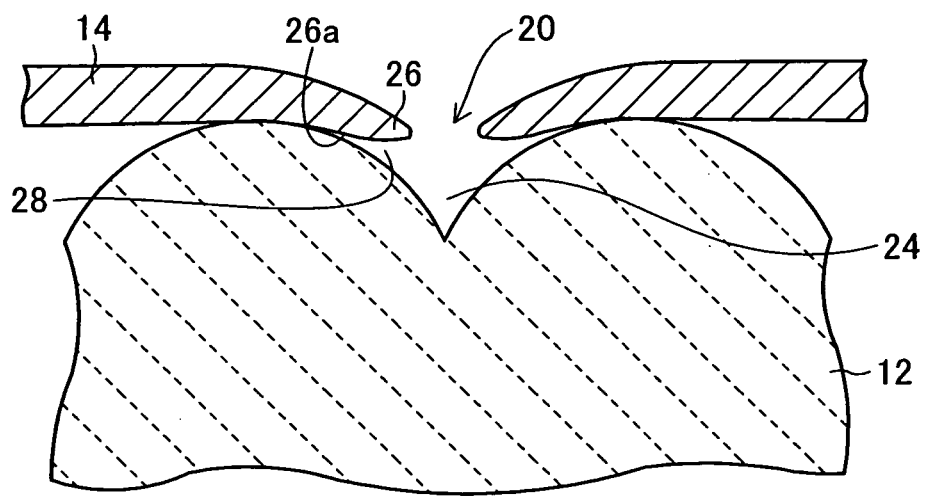
FIG. 16 is a sectional view showing an example of still another modified overhanging shape at the upper electrode.
Figure 17:
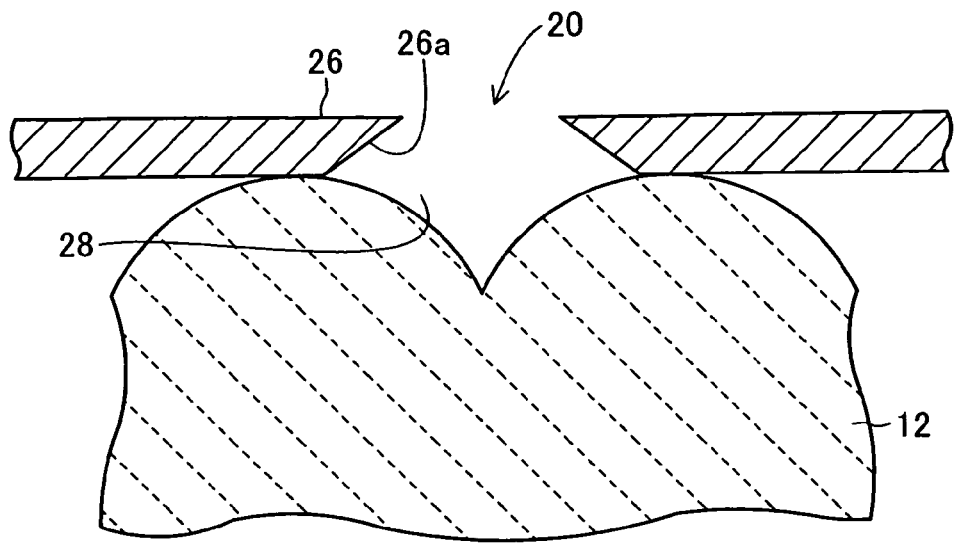
FIG. 17 is a sectional view showing an example of still another modified overhanging shape at the upper electrode.
Figure 18:
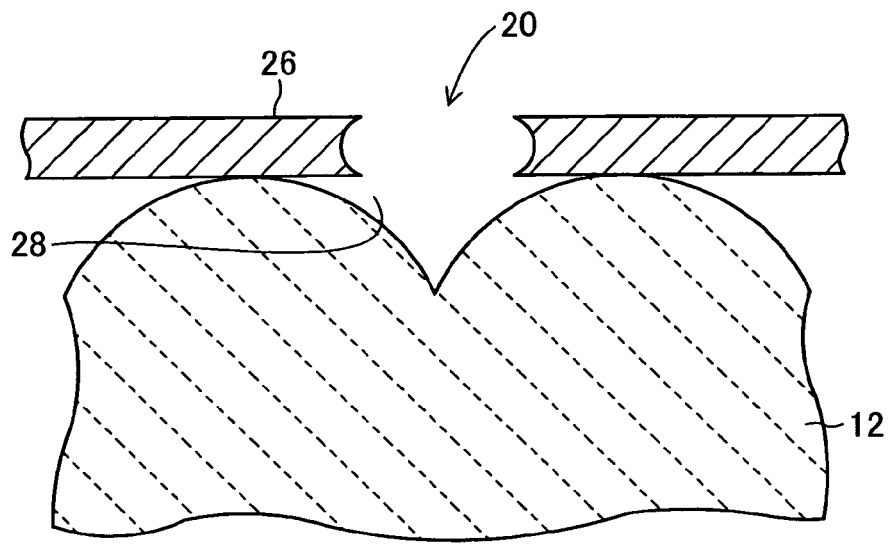
FIG. 18 is a sectional view showing an example of still another modified overhanging shape at the upper electrode.
Figure 19:
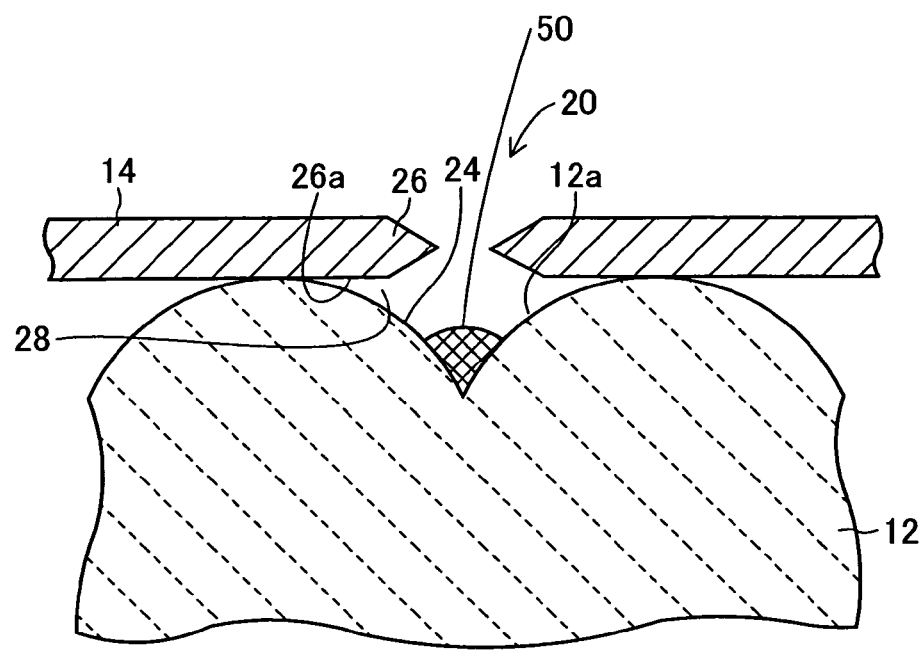
FIG. 19 is a sectional view showing an example of a modification provided with a float electrode in the electron emitter according to the aforesaid embodiments.

Further, with regard to the shape of an opening 20 serving as an electric field concentrated portion at the inner edge, in addition to the shapes explained in the above embodiments, various shapes may be adopted. For example, as shown in FIG. 15, such a shape that the lower surface 26a of the overhang 26 is nearly horizontally flat and the overhang 26 itself gradually tapers toward the inner edge 26b thereof may be adopted. Further, as shown in FIG. 16, the overhang 26 may be formed so that the overhang 26 itself gradually declines toward the concavity 24 of the emitter 12. Furthermore, as shown in FIG. 17, the lower face 26a of the overhang 26 may form an inclined plane directed upward toward the inner edge 26b thereof in a sectional side view. Furthermore, as shown in FIG. 18, the surface of the inner wall of the opening 20 may be formed into a hyperbolic shape. Further, as shown in FIG. 19, a floating electrode 50 may be formed at a portion, on the upper surface 12a of the emitter 12, corresponding to the opening 20.

Further, when an opening 20 having such a shape as to serve as an electric field concentrated portion at the inner edge thereof is adopted as stated above, the upper surface 12a of the emitter 12 formed by the aerosol deposition method and/or the sol impregnation method may be smooth like a mirror surface. Thereby, by selecting the shape of the opening 20, it becomes possible to secure a high packing density and a high dielectric constant of the emitter 12 while increasing the number of the electric field concentrated portions, and hence to increase the field intensity at the electric field concentrated portions and also increase the amount of the emitted electrons more than ever.

Figure 20:
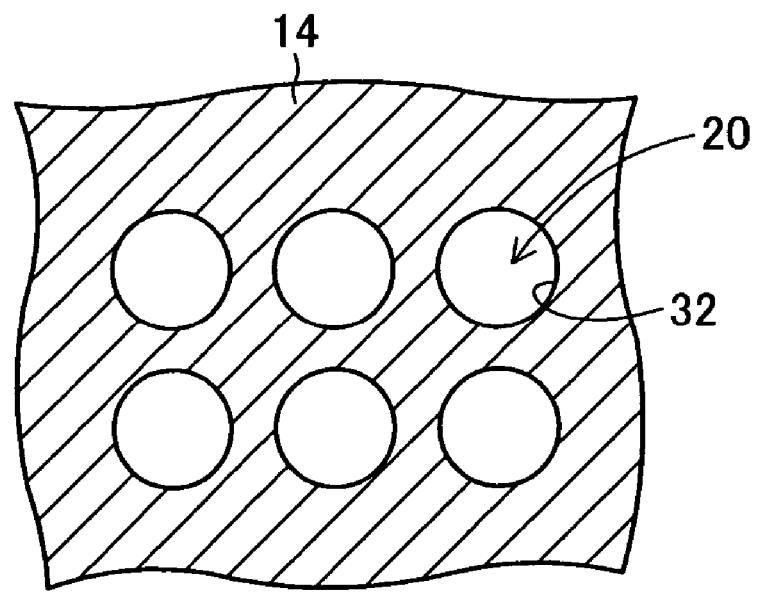
FIG. 20 is a view showing an example of a modified opening shape in the electron emitter according to the aforesaid embodiments.
Figure 21:
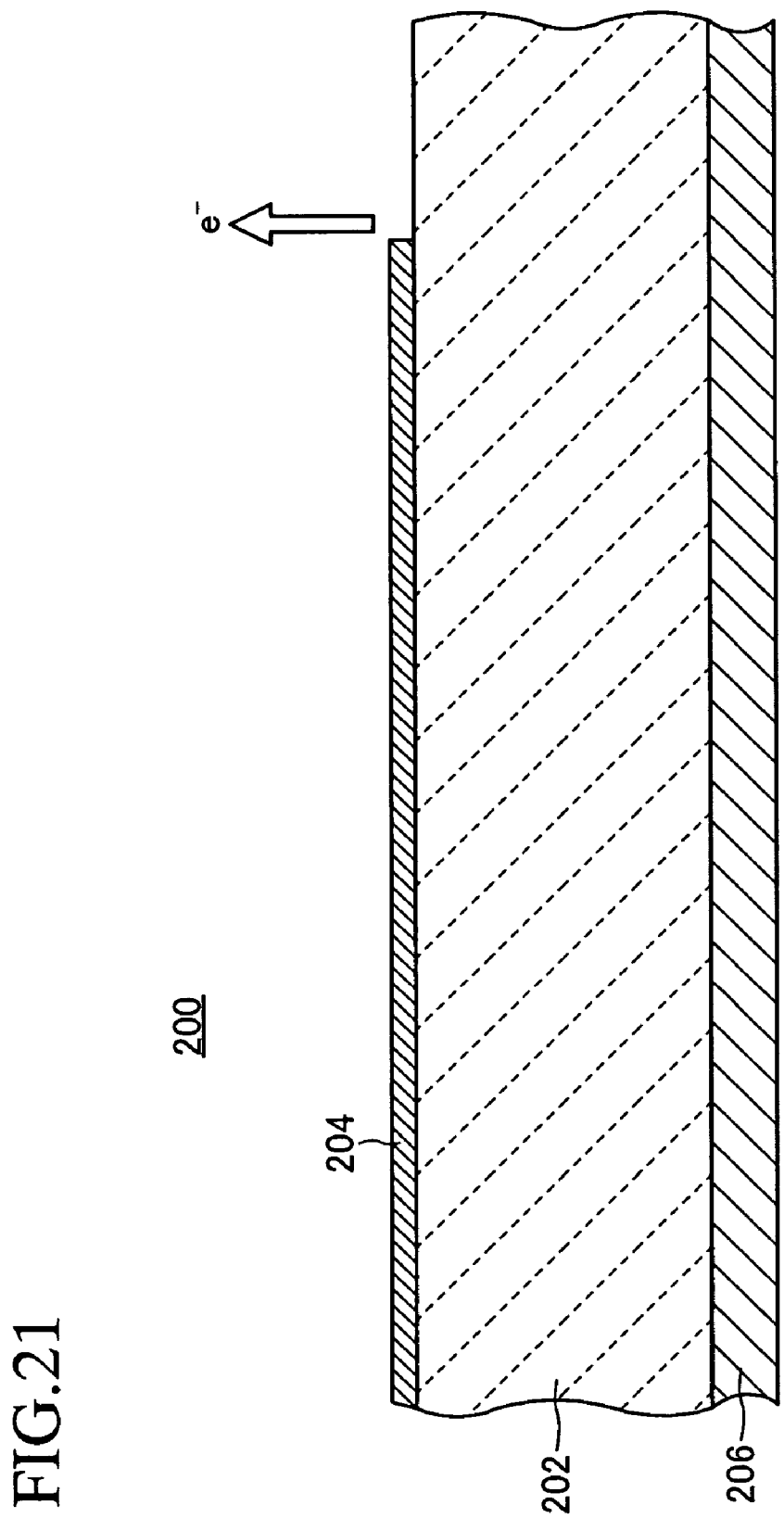
FIG. 21 is a sectional view showing an example of a conventional electron emitter, excluding some portions.

Furthermore, in the production method employed in the above embodiments, the opening 20 of the upper electrode 14 can be formed merely by forming a thick film by controlling the viscosity and compounding ratio of paste and the film thickness even though specific masking or the like is not applied, but, as shown in FIG. 20, the opening 20 may be formed by applying masking or the like so that a hole 32 of a specific shape is formed. In this case, the shape of the hole 32 is a perfect circle macroscopically but a deformed shape microscopically due to the influence of the shape of the conductive particles 15, and the hole 32 can exhibit the functions and effects in increasing the number of the sites where electrons are supplied to the emitter 12.

What is claimed is:

1. A dielectric device having a dielectric layer, the dielectric layer comprising:
    a first layer which has a plurality of first dielectric particles; and
    a second layer which has a plurality of second dielectric particles having a different average particle size from that of the first dielectric particles, the second layer and the first layer stacked in the thickness direction of the dielectric layer, wherein the dielectric layer contains a metal which is mixed therewith.

2. The dielectric device according to claim 1, wherein the first layer and/or the second layer are formed by an aerosol deposition method from fine particles of a dielectric material.

3. The dielectric device of claim 1, wherein the second dielectric particles comprise particulates of sub-micron order.

4. The dielectric device according to claim 2, the device having an emitter comprising the dielectric layer, and first and second electrodes formed on or above the emitter to which a drive voltage is applied to discharge electrons from an upper surface of the emitter.

5. The dielectric device according to claim 4, wherein the first electrode is provided on or above the surface of the emitter, and a gap is provided between an upper surface opposite to the upper surface of the emitter and the upper surface of the emitter in an edge part of the first electrode.

6. The dielectric device according to claim 5, wherein the edge part of the first electrode has a shape such that lines of electric force are concentrated therein.

7. The dielectric device according to claim 6, wherein the first electrode is an aggregation of electrically conductive particles having a longitudinal direction when viewed in lateral cross section, and the electrically conductive particles are disposed so that the longitudinal direction is aligned with the upper surface of the emitter.

8. The dielectric device according to claim 1, further comprising a substrate, wherein particles of the metal are interposed between adjacent dielectric particles of at least the layer nearer to the substrate.

9. The dielectric device according to claim 1, wherein the dielectric particles have a relative constant of 1000 or more.

10. The dielectric device of claim 8, wherein the substrate is glass.

11. The dielectric device of claim 1, wherein at least 30% of the first dielectric particles are 1 μm or more.

* * * * *